United States Patent
Huang et al.

(10) Patent No.: US 10,182,424 B2
(45) Date of Patent: Jan. 15, 2019

(54) TECHNIQUES AND APPARATUSES FOR CONFIGURING TRANSMISSION OF CORRESPONDING UPLINK CONTROL INFORMATION IN NEW RADIO

(71) Applicant: QUALCOMM Incorporated, San Diego, CA (US)

(72) Inventors: Yi Huang, San Diego, CA (US); Wei Zeng, San Diego, CA (US); Hao Xu, Beijing (CN); Renqiu Wang, San Diego, CA (US); Wanshi Chen, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/677,851

(22) Filed: Aug. 15, 2017

(65) Prior Publication Data
US 2018/0176902 A1 Jun. 21, 2018

Related U.S. Application Data

(60) Provisional application No. 62/435,495, filed on Dec. 16, 2016.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0094* (2013.01); *H04W 72/0446* (2013.01);
(Continued)

(58) Field of Classification Search
CPC .......... H04W 72/0413; H04W 72/0446; H04L 5/0094; H04L 1/1812; H04L 1/1854
(Continued)

(56) References Cited

U.S. PATENT DOCUMENTS

2018/0097609 A1\* 4/2018 Tiirola ................. H04L 5/1461

OTHER PUBLICATIONS

Intel Corporation: "UCI Embedding onto UL Data Channels", 3GPP Draft; R1-1611999 UCI Embedding onto UL Data Channels, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051175963, pp. 1-3, Retrieved from the Internet: URL:http://www.3gpp.org/ftp/Meetings_3GPP_SYNC/RAN1/Docs/ [retrieved on Nov. 13, 2016].
(Continued)

*Primary Examiner* — Huy C Ho
(74) *Attorney, Agent, or Firm* — Harrity & Harrity, LLP

(57) ABSTRACT

A method, an apparatus, and a computer program product for wireless communication are provided. The apparatus may receive an uplink control configuration indication in a downlink control portion of a first slot. The first slot may include the downlink control portion, a second portion, and an uplink short burst portion. The second portion may be located between the downlink control portion and the uplink short burst portion. The apparatus may configure a physical uplink control channel (PUCCH), on at least one of the second portion or the uplink short burst portion of the first slot, for transmission of first uplink control information (UCI) based at least in part on the uplink control configuration indication. The first UCI may correspond to second UCI to be transmitted in the first slot or a second slot. The apparatus may transmit the first UCI on the configured UCI.

30 Claims, 26 Drawing Sheets

(51) Int. Cl.
 *H04W 72/12* (2009.01)
 *H04L 1/18* (2006.01)
(52) U.S. Cl.
 CPC ....... *H04W 72/1284* (2013.01); *H04L 1/1812* (2013.01); *H04L 1/1854* (2013.01)
(58) Field of Classification Search
 USPC ........................................................ 455/450
 See application file for complete search history.

(56) References Cited

OTHER PUBLICATIONS

International Search Report and Written Opinion—PCT/US2017/063125—ISA/EPO—dated Feb. 20, 2018.
LG Electronics: "Design of Long Duration UL Control Channel for NR", 3GPP Draft; R11611844 NR Long Duration UL CCH Type Final, 3rd Generation Partnership Project (3GPP), Mobile Competence Centre; 650, Route Des Lucioles ; F-06921 Sophia-Antipolis Cedex; France vol. RAN WG1, No. Reno. USA; Nov. 14, 2016-Nov. 18, 2016, Nov. 13, 2016 (Nov. 13, 2016), XP051175812, 4 Pages, Retrieved from the Internet: URL:http://www.3gpp.org/ftp/Meetings_3GPP_SVNC/RAN1/Docs/ [retrieved on Nov. 13, 2016].
QUALCOMM Incorporated: "UCI Content", 3GPP Draft; R1-1612072, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176032, pp. 1-3, Retrieved from the Internet: URL:http://www.3gpp.org/ftp/Meetings_3GPP_SYNC/RAN1/Docs/ [retrieved on Nov. 13, 2016].
QUALCOMM Incorporated: "UL Channelization in Long UL Duration", 3GPP Draft; R11612074, 3rd Generation Partnership Project (3GPP), Mobile Competence Centre; 650, Route Des Lucioles; F-06921 Sophia-Antipolis Cedex ; France, vol. RAN WG1, No. Reno, U.S.A; Nov. 14, 2016-Nov. 18, 2016, Nov. 13, 2016 (Nov. 13, 2016), XP051176034, pp. 1-5, Retrieved from the Internet: URL:http://www.3gpp.org/ftp/Meetings - 3GPP - SYNC/RAN1/Docs/ [retrieved on Nov. 13, 2016].
QUALCOMM Incorporated: "UL Channelization in Short UL Duration", 3GPP Draft; R1-1612073, 3rd Generation Partnership Project (3GPP), Mobile Competence Centre; 650, Route Des Lucioles; F-06921 Sophia-Antipolis Cedex; France, vol. RAN WG1, No. Reno, U.S.A; Nov. 5, 2016, XP051190671, Retrieved from the Internet: URL:http://www.3gpp.org/ftp/tsg_ran/WG1_RL1/TSGR1_87/Docs/ [retrieved on Nov. 5, 2016], 8 pages.
Samsung: "UL Control Channel Design", 3GPP Draft; R1-1612529 UL Control Channel, 3rd Generation Partnership Project (3GPP), Mobile Competence Centre; 650, Route Des Lucioles; F-06921 Sophia-Antipolis Cedex; France, vol. RAN WG1. No. Reno, USA; Nov. 14, 2016-Nov. 18, 2016, Nov. 13, 2016 (Nov. 13, 2016), XP051176476, pp. 1-4, Retrieved from the Internet: URL:http://www.3gpp.org/ftp/Meetings_3GPP_SVNC/RAN1/Docs/ [retrieved on Nov. 13, 2016].

* cited by examiner

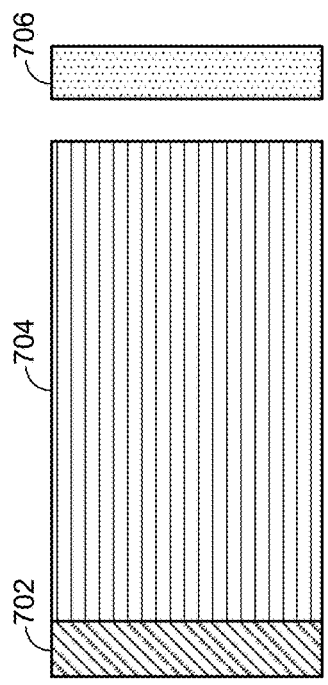
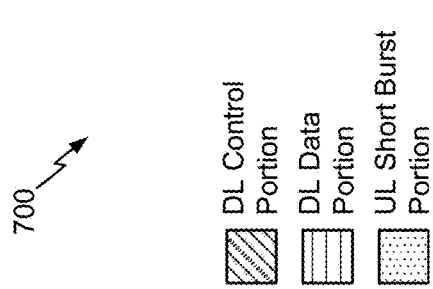
FIG. 7
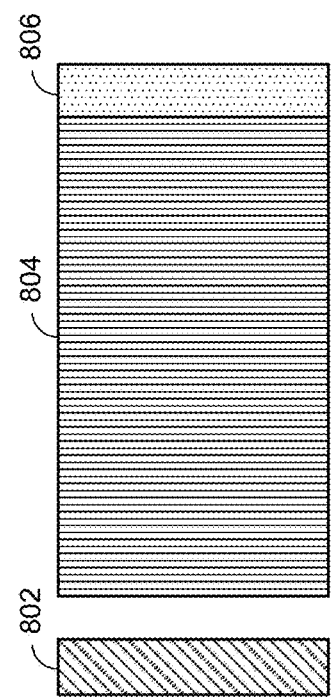
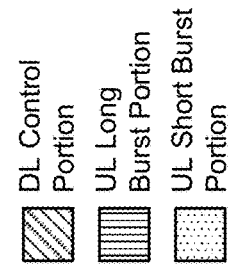
FIG. 8

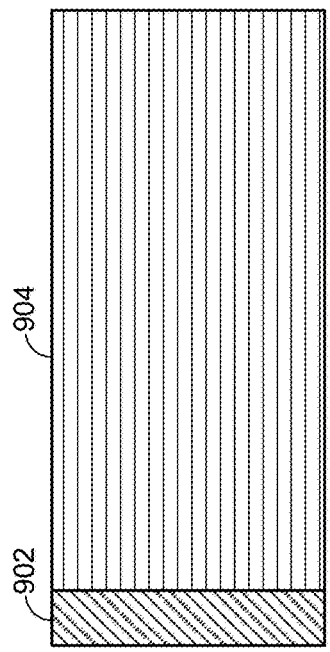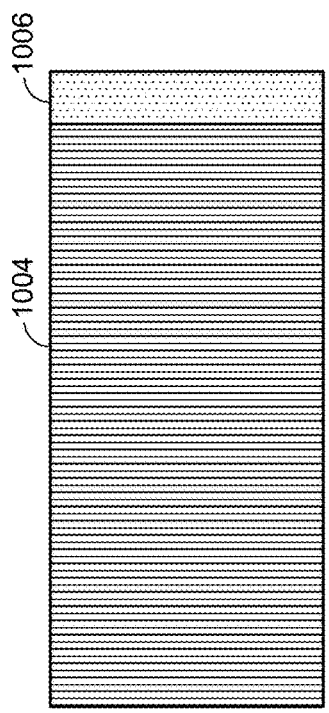

TECHNIQUES AND APPARATUSES FOR CONFIGURING TRANSMISSION OF CORRESPONDING UPLINK CONTROL INFORMATION IN NEW RADIO

CROSS-REFERENCE TO RELATED APPLICATION UNDER 35 U.S.C. § 119

This application claims priority to Provisional Patent Application No. 62/435,495, filed on Dec. 16, 2016, entitled "TECHNIQUES AND APPARATUSES FOR CONFIGURING TRANSMISSION OF CORRESPONDING UPLINK CONTROL INFORMATION IN NEW RADIO," which is hereby expressly incorporated by reference herein.

BACKGROUND

Field

Aspects of the present disclosure generally relate to wireless communication, and more particularly to techniques and apparatuses for configuring transmission of corresponding uplink control information in New Radio.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include receiving, by a user equipment (UE), an uplink control configuration indication in a downlink control portion of a first slot, the first slot including the downlink control portion, a second portion, and an uplink short burst portion, the second portion being located between the downlink control portion and the uplink short burst portion. The method may include configuring, by the UE, a physical uplink control channel (PUCCH), on at least one of the second portion or the uplink short burst portion of the first slot, for transmission of first uplink control information (UCI) based at least in part on the uplink control configuration indication, wherein the first UCI corresponds to second UCI to be transmitted in the first slot or a second slot. The method may include transmitting, by the UE, the first UCI on the configured PUCCH.

In some aspects, the apparatus may include a memory and at least one processor coupled to the memory. The at least one processor may be configured to receive an uplink control configuration indication in a downlink control portion of a first slot, the first slot including the downlink control portion, a second portion, and an uplink short burst portion, the second portion being located between the downlink control portion and the uplink short burst portion. The at least one processor may be configured to configure a PUCCH, on at least one of the second portion or the uplink short burst portion of the first slot, for transmission of first UCI based at least in part on the uplink control configuration indication, wherein the first UCI corresponds to second UCI to be transmitted in the first slot or a second slot. The at least one processor may be configured to transmit the first UCI on the configured PUCCH.

In some aspects, the apparatus may include means for receiving an uplink control configuration indication in a downlink control portion of a first slot, the first slot including the downlink control portion, a second portion, and an uplink short burst portion, the second portion being located between the downlink control portion and the uplink short burst portion. The apparatus may include means for configuring a PUCCH, on at least one of the second portion or the uplink short burst portion of the first slot, for transmission of first UCI based at least in part on the uplink control configuration indication, wherein the first UCI corresponds to second UCI to be transmitted in the first slot or a second slot. The apparatus may include means for transmitting the first UCI on the configured PUCCH.

In some aspects, the computer program product may include a non-transitory computer-readable medium storing computer executable code. The code may include code for receiving an uplink control configuration indication in a downlink control portion of a first slot, the first slot including the downlink control portion, a second portion, and an uplink short burst portion, the second portion being located between the downlink control portion and the uplink short burst portion. The code may include code for configuring a PUCCH, on at least one of the second portion or the uplink short burst portion of the first slot, for transmission of first UCI based at least in part on the uplink control configuration indication, wherein the first UCI corresponds to second UCI to be transmitted in the first slot or a second slot. The code may include code for transmitting the first UCI on the configured PUCCH.

In some aspects, the method may include transmitting, by a base station, an uplink control configuration indication in a downlink control portion of a first slot, the first slot including the downlink control portion, a second portion, and an uplink short burst portion, the second portion located between the downlink control portion and the uplink short burst portion, wherein the uplink control configuration indication instructs a user equipment (UE) to configure a physical uplink control channel (PUCCH), on at least one of the second portion or the uplink short burst portion of the first slot, for transmission of a first uplink control information (UCI), wherein the first UCI corresponds to second UCI to be transmitted by the UE in the first slot or a second slot. The method may include receiving, by the base station, the first UCI on the configured PUCCH.

In some aspects, the apparatus may include a memory and at least one processor coupled to the memory. The at least one processor may be configured to transmit an uplink control configuration indication in a downlink control portion of a first slot, the first slot including the downlink control portion, a second portion, and an uplink short burst portion, the second portion located between the downlink control portion and the uplink short burst portion, wherein the uplink control configuration indication instructs a UE to configure a PUCCH, on at least one of the second portion or the uplink short burst portion of the first slot, for transmission of a first UCI, wherein the first UCI corresponds to second UCI to be transmitted by the UE in the first slot or a second slot. The at least one processor may be configured to receive the first UCI on the configured PUCCH.

In some aspects, the apparatus may include means for transmitting an uplink control configuration indication in a downlink control portion of a first slot, the first slot including the downlink control portion, a second portion, and an uplink short burst portion, the second portion located between the downlink control portion and the uplink short burst portion, wherein the uplink control configuration indication instructs a UE to configure a PUCCH, on at least one of the second portion or the uplink short burst portion of the first slot, for transmission of a first UCI, wherein the first UCI corresponds to second UCI to be transmitted by the UE in the first slot or a second slot. The apparatus may include means for receiving the first UCI on the configured PUCCH.

In some aspects, the computer program product may include a non-transitory computer-readable medium storing computer executable code. The code may include code for transmitting an uplink control configuration indication in a downlink control portion of a first slot, the first slot including the downlink control portion, a second portion, and an uplink short burst portion, the second portion located between the downlink control portion and the uplink short burst portion, wherein the uplink control configuration indication instructs a UE to configure a PUCCH, on at least one of the second portion or the uplink short burst portion of the first slot, for transmission of a first UCI, wherein the first UCI corresponds to second UCI to be transmitted by the UE in the first slot or a second slot. The code may include code for receiving the first UCI on the configured PUCCH.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 7 is a diagram illustrating an example of a downlink (DL)-centric slot.

FIG. 8 is a diagram illustrating an example of an uplink (UL)-centric slot.

FIG. 9 is a diagram illustrating an example of a full-DL slot.

FIG. 10 is a diagram illustrating an example of a full-UL slot.

DETAILED DESCRIPTION

Figure 1:
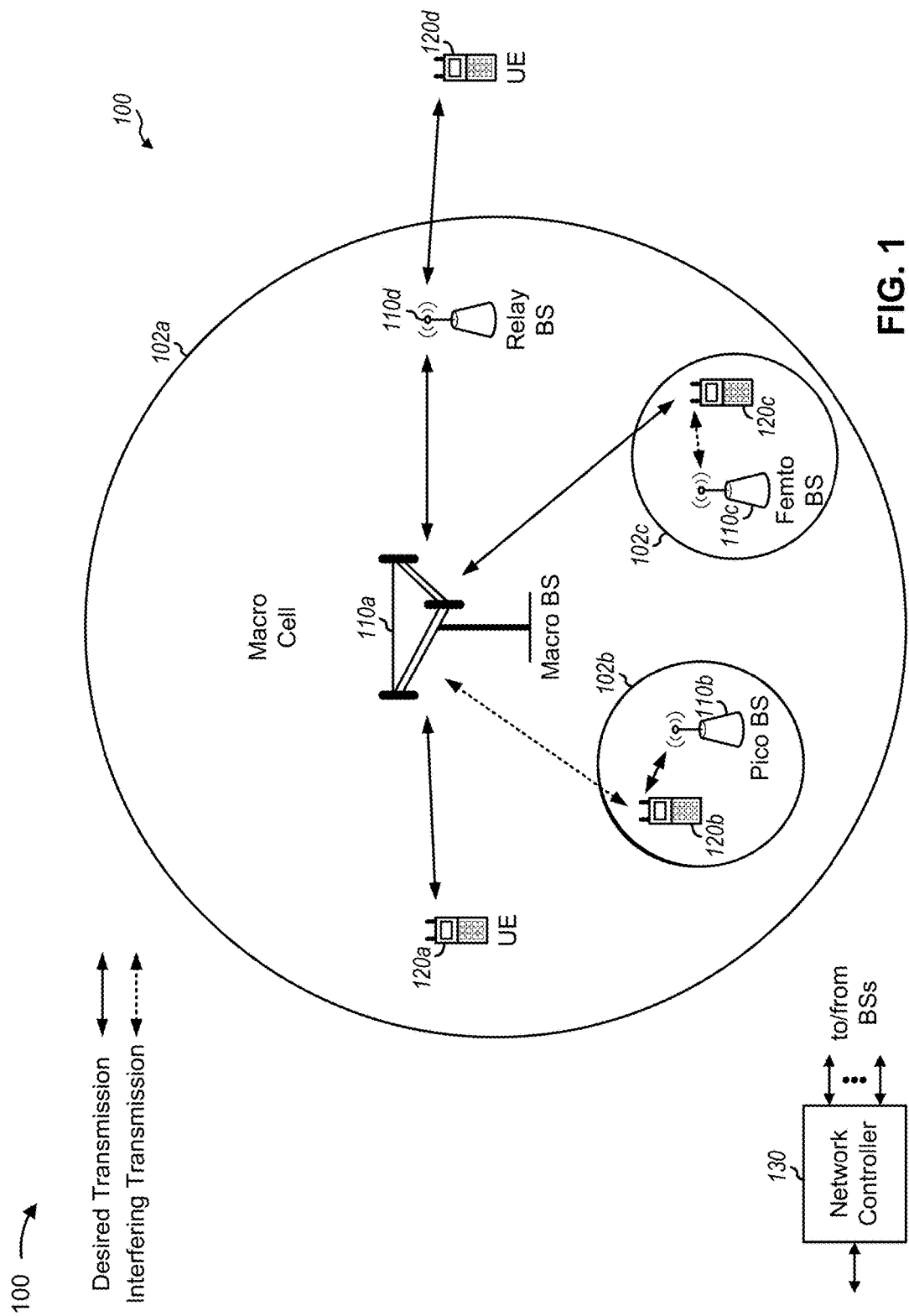
FIG. 1 is diagram| illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs).

In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
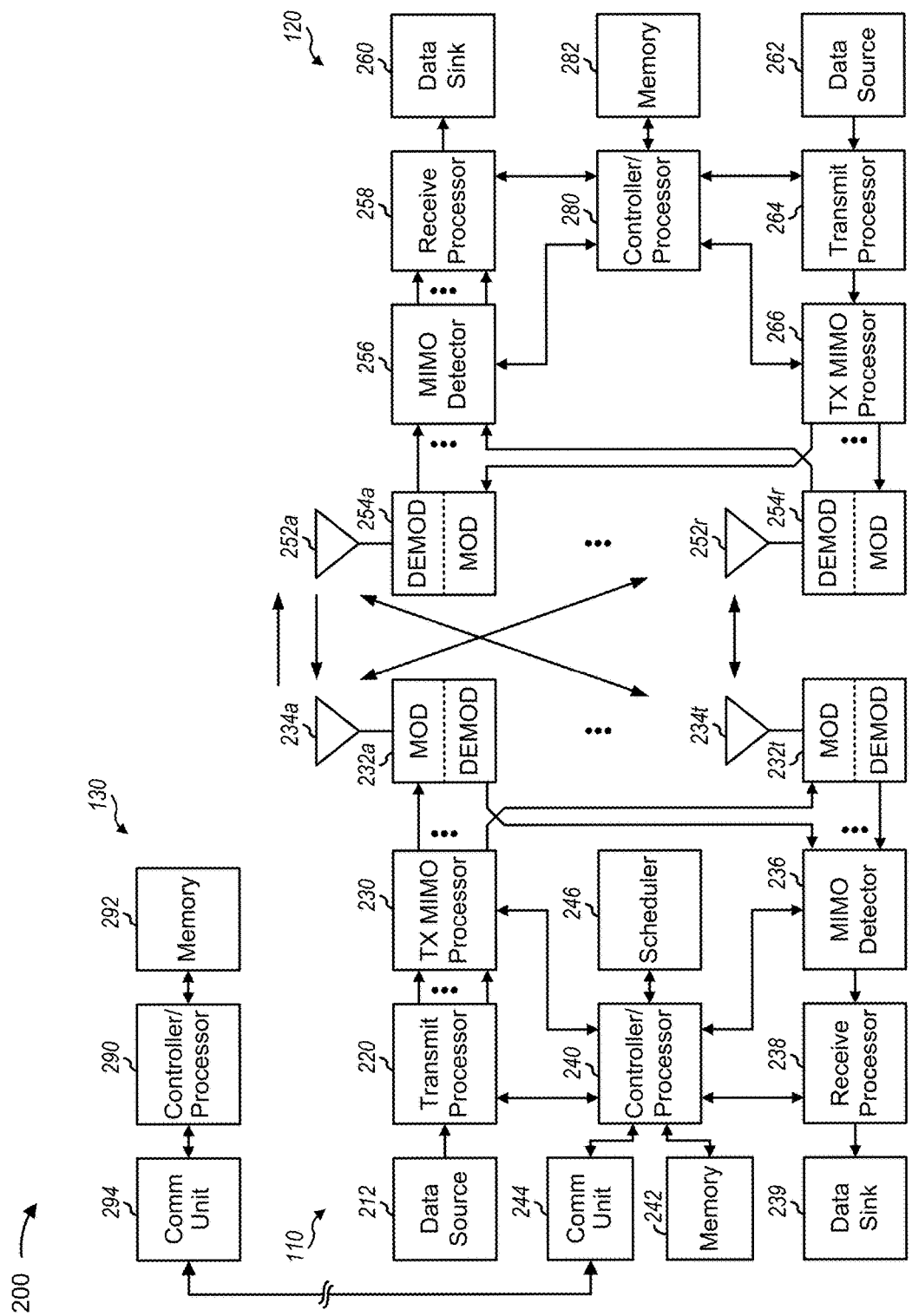
FIG. 2 is a diagram illustrating an example of a base station in communication with a user equipment (UE) in a wireless communication network.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to configure transmission of corresponding uplink control information in New Radio. For example, controller/processor 280 and/or other processors and modules at base station 110, may perform or direct operations of UE 120 to configure transmission of corresponding uplink control information in New Radio. For example, controller/processor 280 and/or other controllers/processors and modules at BS 110 may perform or direct operations of, for example, process 1700 of FIG. 17, process 1800 of FIG. 18, and/or other processes as described herein. In some aspects, one or more of the components shown in FIG. 2 may be employed to perform example process 1700 of FIG. 17, example process 1800 of FIG. 18, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
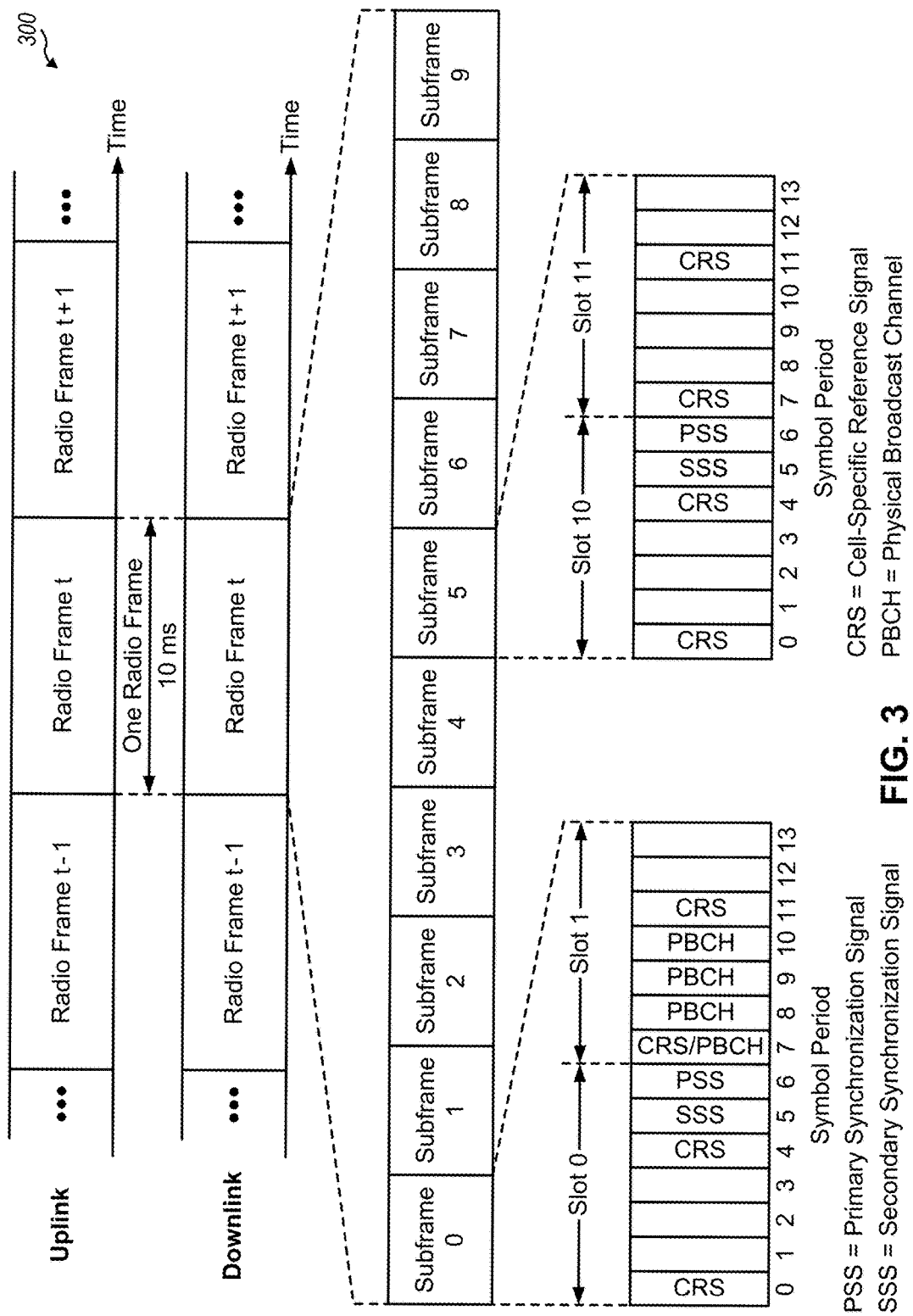
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2 L symbol periods in each subframe may be assigned indices of 0 through 2 L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
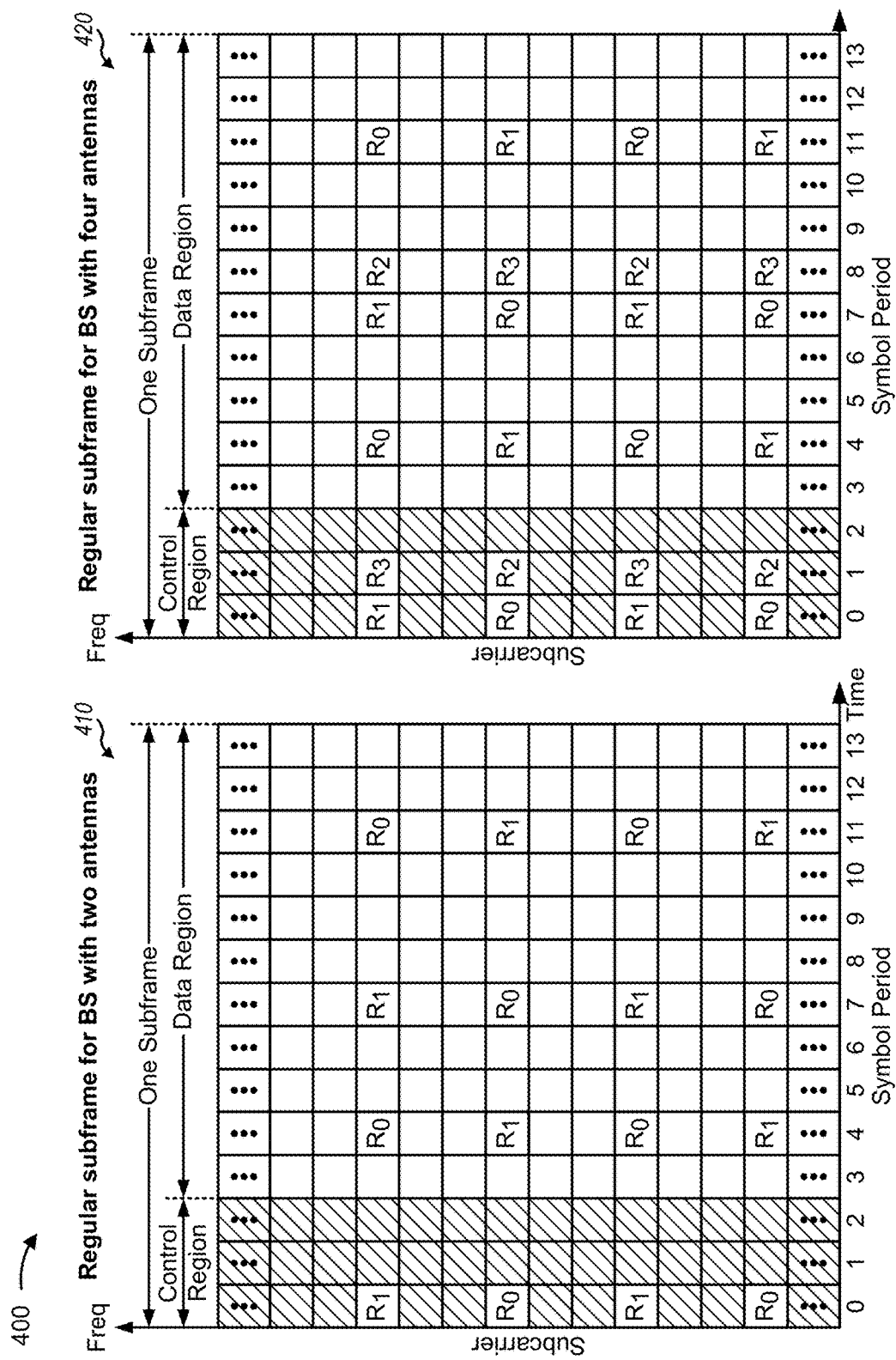
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
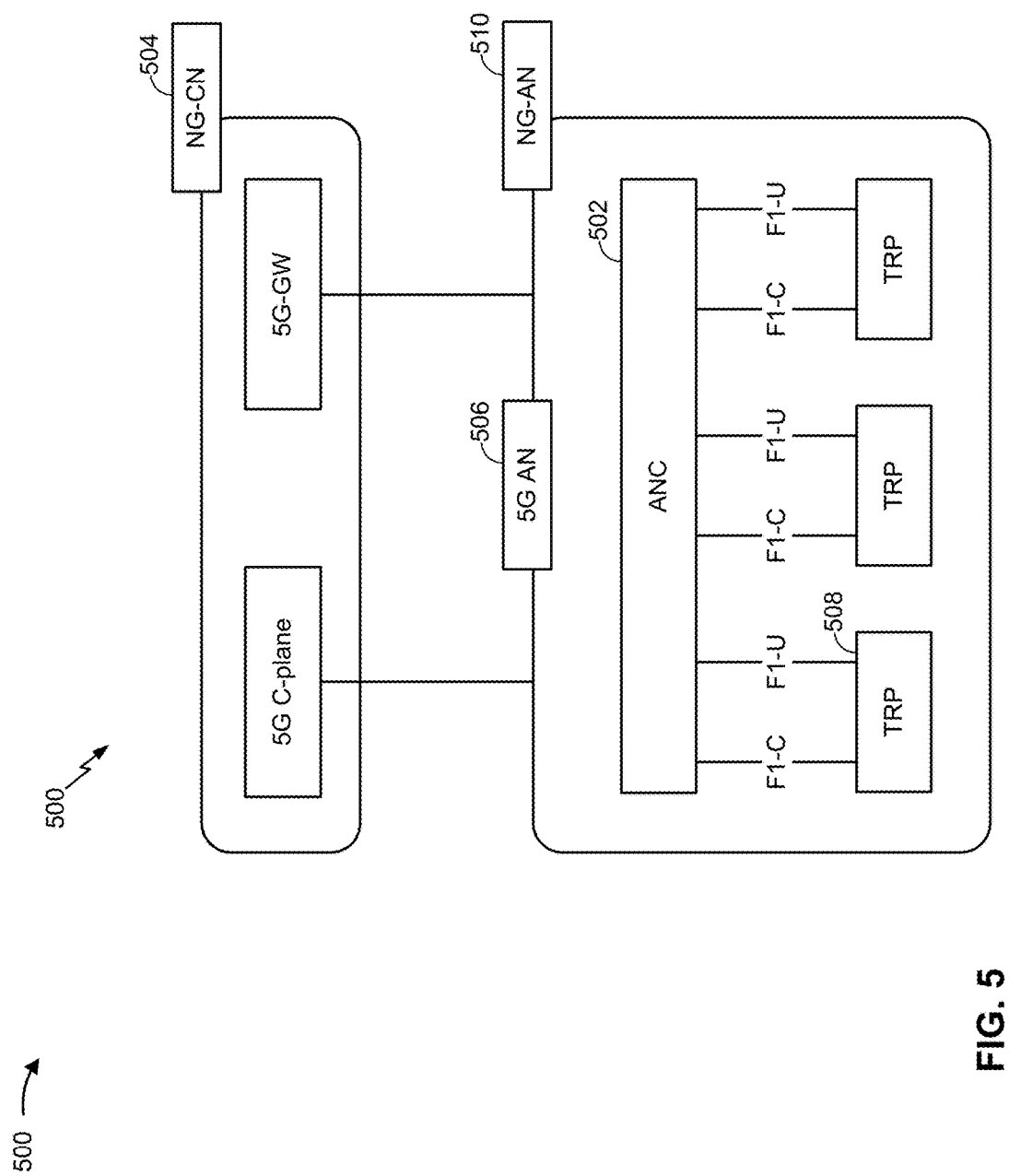
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
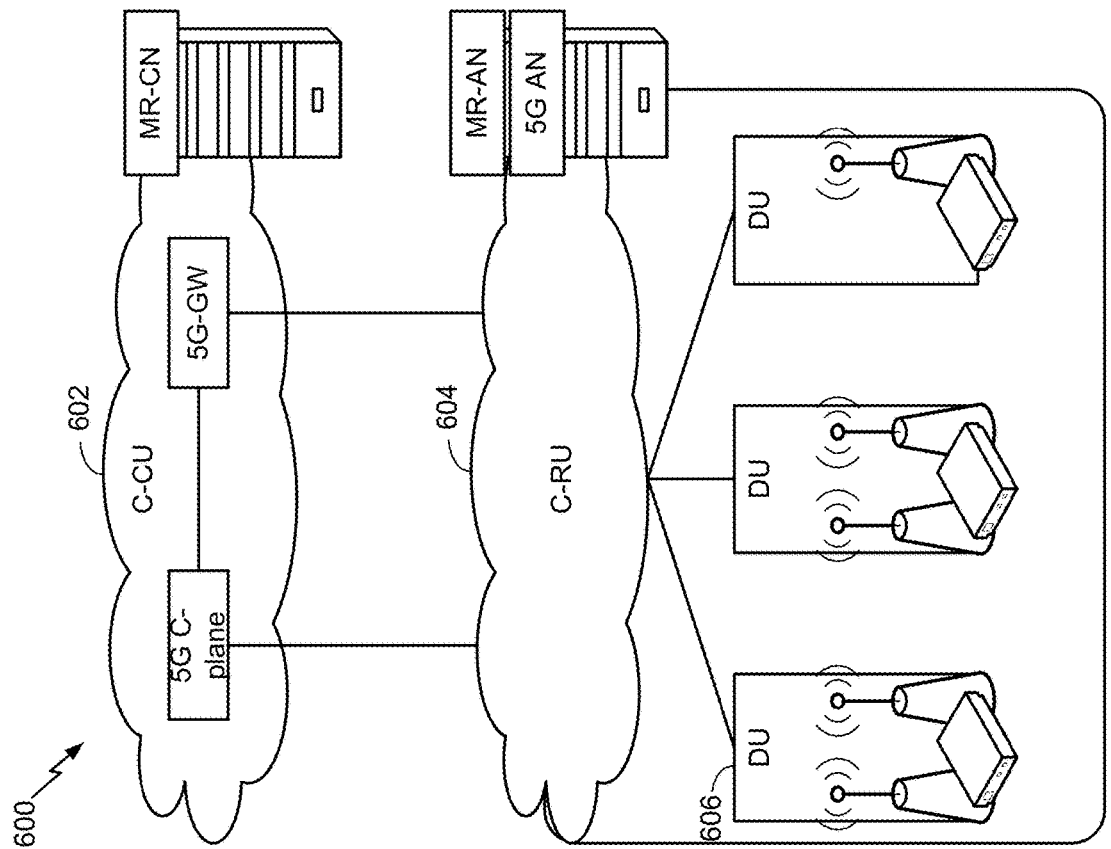
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric slot or wireless communication structure. The DL-centric slot may include: a first portion, such as a DL control portion 702; a second portion, such as a DL data portion 704; and a third portion, such as an UL short burst portion 706. The DL control portion 702 may be located at the beginning of the DL-centric slot. The DL control portion 702 may include various scheduling information and/or control information corresponding to various portions of the DL-centric slot. In some configurations, the DL control portion 702 may be used for communications on a physical DL control channel (PDCCH).

The DL data portion 704 may be located between the DL control portion 702 and the UL short burst portion 706. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be used for communications on a physical DL shared channel (PDSCH).

The UL short burst portion 706 may be located at the end of the DL-centric slot. The UL short burst portion 706 may sometimes be referred to as a common UL portion, an UL burst, an UL burst portion, a common UL burst, a short burst, an UL short burst, a common UL short burst, a common UL short burst portion, and/or various other suitable terms. In some aspects, the UL short burst portion 706 may be used for communications on a physical UL control channel (PUCCH). Additionally, or alternatively, the UL short burst portion 706 may be used for communication of uplink control information (UCI), such as a scheduling request (SR), HARQ information (e.g., PUCCH ACK, a PUSCH ACK, a PUCCH NACK, a PUSCH NACK, and/or the like), a channel quality indicator (CQI), a channel state indication (CSI), a buffer status report (BSR), a sounding reference signal (SRS), a demodulation reference signal (DMRS), and/or various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric slot, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric slot or wireless communication structure. The UL-centric slot may include: a first portion, such as a DL control portion 802; a second portion, such as an UL long burst portion 804; and a third portion, such as an UL short burst portion 806. The DL control portion 802 may be located at the beginning of the UL-centric slot. The DL control portion 802 in FIG. 8 may be similar to the DL control portion 702 described above with reference to FIG. 7. In some configurations, the DL control portion 802 may be used for communications on a physical DL control channel (PDCCH).

The UL long burst portion 804 may be located between the DL control portion 802 and the UL short burst portion 806. The UL long burst portion 804 may sometimes be referred to as the payload of the UL-centric slot. The UL long burst portion 804 may refer to the communication resources utilized to communicate UL data from the subordinate entity (e.g., UE) to the scheduling entity (e.g., UE or BS). In some configurations, the UL long burst portion 804 may be used for communications on a physical UL shared channel (PUSCH) and/or a physical uplink control channel (PUCCH), as described herein.

As illustrated in FIG. 8, the end of the DL control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL short burst portion 806 may be located at the end of the UL-centric slot. The UL short burst portion 806 in FIG. 8 may be similar to the UL short burst portion 706 described above with reference to FIG. 7, and may include any of the information described above in connection with FIG. 7. The foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples are possible and may differ from what was described with regard to FIG. 8.

FIG. 9 is a diagram 900 showing an example of a full-DL slot or wireless communication structure. The full-DL slot may include the first portion and the second portion described above in connection with FIG. 7 (e.g., the DL control portion 702 and the DL data portion 704), shown as a DL control portion 902 and a DL data portion 904. The full-DL slot may exclude the third portion described above in connection with FIG. 7 (e.g., the UL short burst portion 706).

The DL control portion 902 may be located at the beginning of the full-DL slot. The DL control portion 902 may be used in a similar manner as the DL control portion 702 and/or the DL control portion 802, described above in connection with FIG. 7 and FIG. 8.

The DL data portion 904 may be located after the DL control portion 902 and at an end of the full-DL slot. The DL data portion 904 may be used in a similar manner as the DL data portion 704, described above in connection with FIG. 7.

As indicated above, FIG. 9 is provided merely as an example. Other examples are possible and may differ from what was described with regard to FIG. 9.

FIG. 10 is a diagram 1000 showing an example of a full-UL slot or wireless communication structure. The full-UL slot may include the second portion and the third portion described above in connection with FIG. 8 (e.g., the UL long burst portion 804 and the UL short burst portion 806), shown as an UL long burst portion 1004 and an UL short burst portion 1006. The full-UL slot may exclude the first portion described above in connection with FIG. 8 (e.g., the DL control portion 802).

The UL long burst portion 1004 may be located at the beginning of the full-UL slot. The UL long burst portion 1004 may be used in a similar manner as the UL long burst portion 804, described above in connection with FIG. 8.

The UL short burst portion 1006 may be located after the UL long burst portion 1004 and at an end of the full-UL slot. The UL short burst portion 1006 may be used in a similar manner as the UL short burst portion 706 and/or the UL short burst portion 806, described above in connection with FIG. 7 and FIG. 8.

As indicated above, FIG. 10 is provided merely as an example. Other examples are possible and may differ from what was described with regard to FIG. 10.

In New Radio, a slot may have a length of 0.5 milliseconds or less, as compared to a 1 millisecond subframe in LTE. As a result, a UE may use less energy to transmit information in New Radio as compared to LTE, which may result in reduced uplink performance. To enhance uplink performance in New Radio, and in particular to enhance the likelihood that uplink control information (UCI) transmitted via the PUCCH is received by a base station, the UE may use multiple slots and/or multiple portions of a slot to transmit the UCI, especially if the UE is located at a cell edge. Aspects described herein permit a UE to configure transmission of corresponding UCI in multiple portions of a slot and/or in multiple slots, thereby increasing uplink performance. The corresponding UCI may include, for example, repeated UCI or jointly encoded UCI.

Figure 11A:
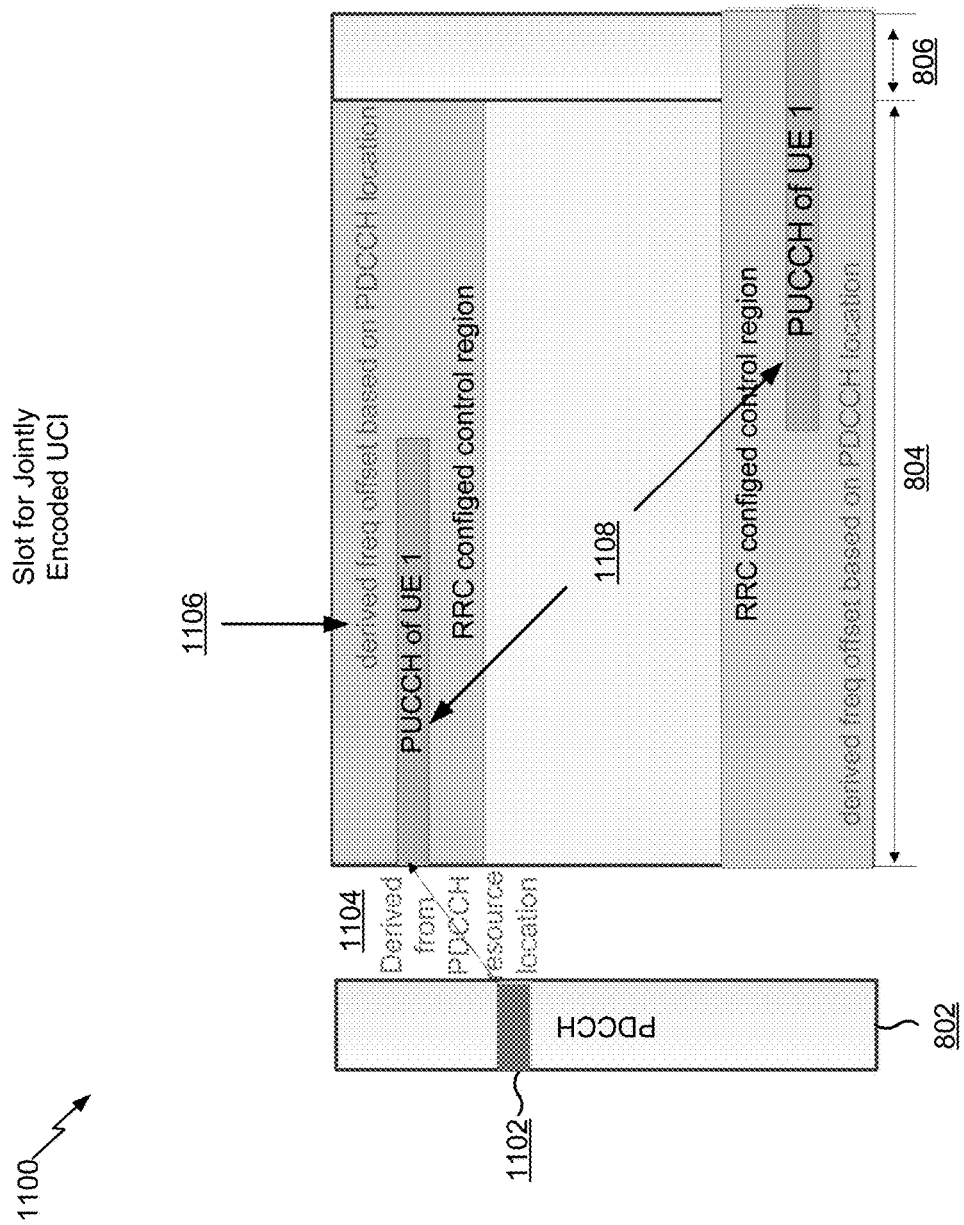
FIGS. 11A and 11B are diagrams illustrating examples of configuring transmission of corresponding uplink control information in New Radio.
Figure 11B:
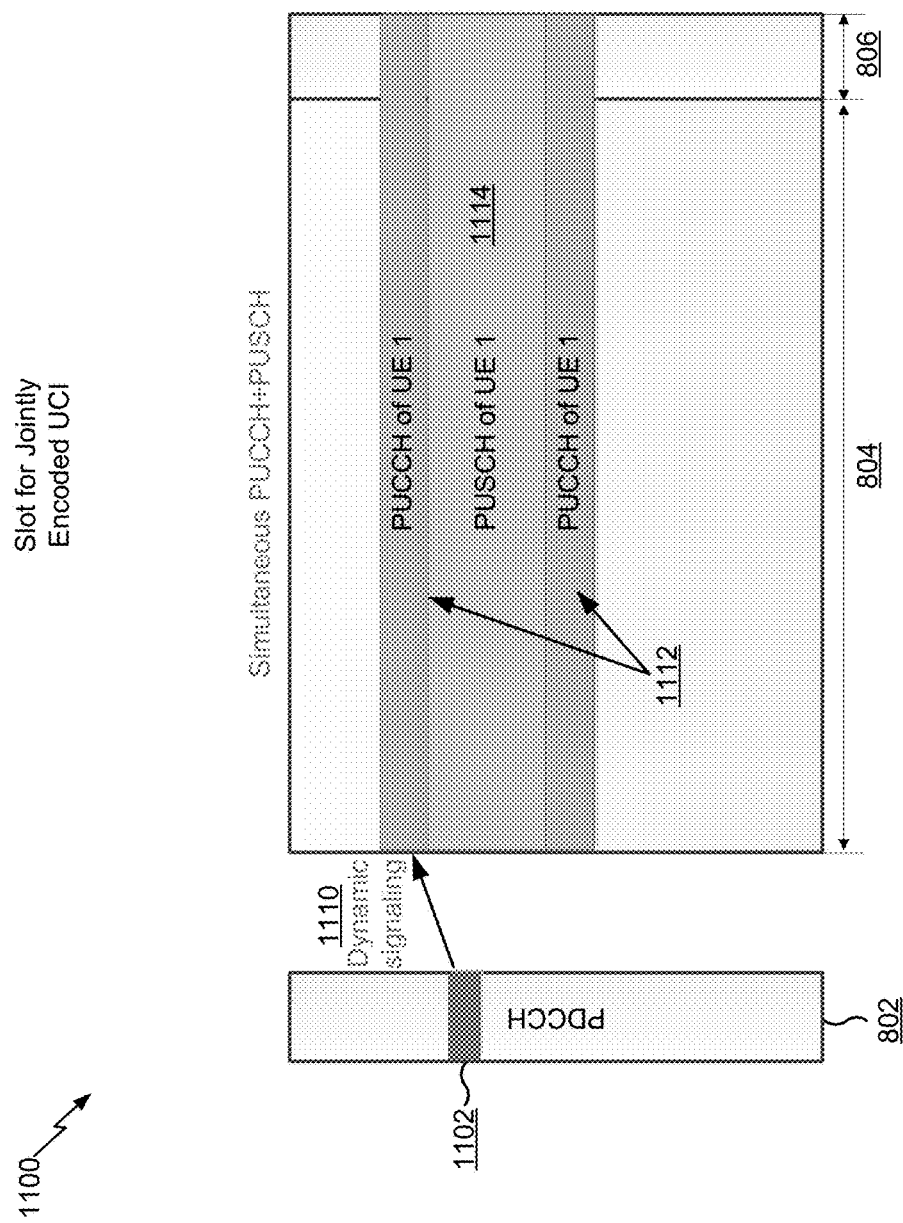

FIGS. 11A and 11B are diagrams illustrating examples 1100 of configuring transmission of corresponding UCI in New Radio. FIGS. 11A and 11B show examples where first UCI and second UCI are jointly encoded and transmitted in a same UL-centric slot. The UL-centric slot may include the DL control portion 802, the UL long burst portion 804, and the UL short burst portion 806, as described above in connection with FIG. 8. The UL-centric slot may be used for communication between a UE (the UE 120 of FIG. 1 and/or the like) and a base station (e.g., the base station 110 of FIG. 1 and/or the like).

As shown in FIG. 11A, the UE may receive an UL control configuration indication 1102 in the DL control portion 802 of the UL-centric slot. The UE may configure a PUCCH on at least one other portion of the UL-centric slot for transmission of the jointly encoded UCI (e.g., the jointly encoded first UCI and second UCI) based at least in part on the UL control configuration indication 1102. For example, the UE may configure the PUCCH on the UL long burst portion 804 and/or the UL short burst portion 806. The UE may transmit the jointly encoded UCI on the PUCCH configured on the portion(s) of the UL-centric slot.

In some aspects, the UE may configure the PUCCH on both the UL long burst portion 804 and the UL short burst portion 806, and may transmit the jointly encoded UCI, on the PUCCH, in both the UL long burst portion 804 and the UL short burst portion 806. For example, the PUCCH may extend across an ending boundary of the UL long burst portion 804 and a starting boundary of the UL short burst portion 806.

In some aspects, the UL control configuration indication 1102 may indicate whether the PUCCH is to be configured in only the UL long burst portion 804 or in both the UL long burst portion 804 and the UL short burst portion 806. For example, one or more bits of the UL control configuration indication 1102 may indicate whether the PUCCH is to extend across the ending boundary of the UL long burst portion 804 and the starting boundary of the UL short burst portion 806.

In some aspects, the UE may be configured with a default configuration to configure the PUCCH in both the UL long burst portion 804 and the UL short burst portion 806 of UL-centric slots. In this case, when the UL control configuration indication 1102 indicates that the PUCCH is to be configured in only the UL long burst portion 804 of an UL-centric slot (or in only the UL short burst portion 806), then the UE may truncate one or more bits of the jointly encoded UCI. For example, when the UL control configuration indication 1102 indicates that the PUCCH is to be configured in only the UL long burst portion 804, then the UE may truncate one or more bits of the jointly encoded UCI that would have been transmitted in the UL short burst portion 806 according to the default configuration, and may transmit the remaining bit(s) of the jointly encoded UCI in the UL long burst portion 804. In this way, the UE may use the same encoding scheme to jointly encode the first UCI and the second UCI based on the default configuration, thereby reducing complexity and conserving UE resources, while having the flexibility to handle transmissions that are different from the default configuration.

In some aspects, the UE may be configured with a default configuration to configure the PUCCH in only the UL long burst portion 804 of UL-centric slots (or in only the UL short burst portion 806). In this case, when the UL control configuration indication 1102 indicates that the PUCCH is to be configured in both the UL long burst portion 804 and the UL short burst portion 806, then the UE may repeat one or more bits of the jointly encoded UCI. For example, when the default configuration is to configured the PUCCH in only the UL long burst portion 804 of UL-centric slots, and the UL control configuration indication 1102 indicates that the PUCCH is to be configured in both the UL long burst portion 804 and the UL short burst portion 806 of an UL-centric slot, then the UE may repeat (e.g., copy) one or more bits of the jointly encoded UCI that are transmitted in the UL long burst portion 804, and may transmit the repeated bit(s) in the UL short burst portion 806. In this way, the UE may use the same encoding scheme to jointly encode the first UCI and the second UCI based on the default configuration, thereby reducing complexity and conserving UE resources, while having the flexibility to handle transmissions that are different from the default configuration.

In some aspects, a duration of the DL control portion 802 may be different in different slots. In this case, the UE may truncate or repeat one or more bits of the jointly encoded UCI based at least in part on the duration of the DL control portion 802, in a similar manner as described above. For example, if the DL control portion 802 for a slot is shorter than a default DL control portion, then the UE may repeat one or more bits of the jointly encoded UCI, and may transmit those bit(s) in the UL long burst portion 804 and/or the UL short burst portion 806, which may be lengthened due to the shorter DL control portion 802. Similarly, if the DL control portion 802 for a slot is longer than a default DL control portion, then the UE may truncate one or more bits of the jointly encoded UCI, and may transmit the remaining bit(s) in the UL long burst portion 804 and/or the UL short burst portion 806, which may be shortened due to the longer DL control portion 802. In this way, the UE may use the same encoding scheme to jointly encode the first UCI and the second UCI based on the default configuration, thereby reducing complexity and conserving UE resources, while having the flexibility to handle transmissions that are different from the default configuration.

In some aspects, the UE may configure the PUCCH on one or more frequency bands. As shown by reference number 1104, in some aspects, the one or more frequency bands may be derived from a characteristic associated with reception of the UL control configuration indication 1102. For example, the characteristic may include a frequency band used for reception of the UL control configuration indication 1102, and the one or more frequency bands of the PUCCH may be derived from the frequency band used for reception of the UL control configuration indication 1102.

As shown by reference number 1106, in some aspects, the UE may use the characteristic to derive a frequency offset, and may determine the one or more frequency bands based at least in part on the frequency offset. For example, the UE may be configured with a frequency band control region (e.g., identified in a radio resource control (RRC) configuration message), and may determine the one or more frequency bands by applying the frequency offset to a boundary of the frequency band control region, as shown. As used herein, the UE may derive a value (e.g., one or more frequency bands for the PUCCH) by applying a function to another value (e.g., a frequency band used for reception of the UL control configuration indication 1102). The function may be a default function stored by the UE, or may be a function signaled to the UE by a base station (e.g., in an RRC connection configuration message).

As shown by reference number 1108, in some aspects, the UE may configure the PUCCH on multiple frequency bands. For example, the UE may derive the multiple frequency bands based at least in part on a characteristic of the UL control configuration indication 1102, as described above. In some aspects, the UE may be configured with multiple frequency band control regions, and may apply the same offset, derived from the characteristic, to the multiple frequency band control regions to determine the multiple frequency bands for the PUCCH. In some aspects, the UE may apply a different offset. In this way, the UE may use frequency diversity to increase a likelihood of successful reception and decoding of the UCI by a base station.

As further shown, in some aspects, the UE may configure the PUCCH on different frequency bands during different time periods. In this case, the UE may transmit a first portion of the jointly encoded UCI using a first frequency band at a first time period, and may transmit a second portion of the jointly encoded UCI using a second frequency band at a second time period. In some aspects, the time periods may not overlap, as shown. In this way, the UE may use frequency diversity to increase a likelihood of successful reception and decoding of the UCI by a base station.

As shown in FIG. 11B, and by reference number 1110, in some aspects, the one or more frequency bands for the PUCCH may be signaled in the UL control configuration indication 1102. For example, the UL control configuration indication 1102 may include information that identifies the one or more frequency bands, and the UE may determine the one or more frequency bands based on this information (e.g., without applying a function to derive the one or more frequency bands).

As shown by reference number 1112, in some aspects, the UE may configure the PUCCH on multiple frequency bands. For example, the multiple frequency bands may be signaled in the UL control configuration indication 1102, as described above. Additionally, or alternatively, one of the frequency bands may be signaled in the UL control configuration indication 1102, and the UE may derive the other frequency band(s) based at least in part on the signaled frequency band(s). For example, the UE may apply a frequency offset to the signaled frequency band(s) to determine the other frequency band(s). In this way, the UE may use frequency diversity to increase a likelihood of successful reception and decoding of the UCI by a base station. In some aspects, as shown, the UE may configure the PUCCH on different frequency bands during a same time period.

As shown by reference number 1114, in some aspects, the UE may configure a PUSCH on the UL long burst portion 804 and/or the UL short burst portion 806. The PUSCH may be configured for transmission of content concurrently with the first UCI and/or the second UCI. For example, the UE may transmit the jointly encoded UCI on the PUCCH (e.g., on one or more PUCCH frequency bands) concurrently with transmission of the content on the PUSCH (e.g., on one or more PUSCH frequency bands). In this way, the UE may increase uplink throughput using concurrent transmissions.

As indicated above, FIGS. 11A and 11B are provided as examples. Other examples are possible and may differ from what was described with respect to FIGS. 11A and 11B.

Figure 12A:
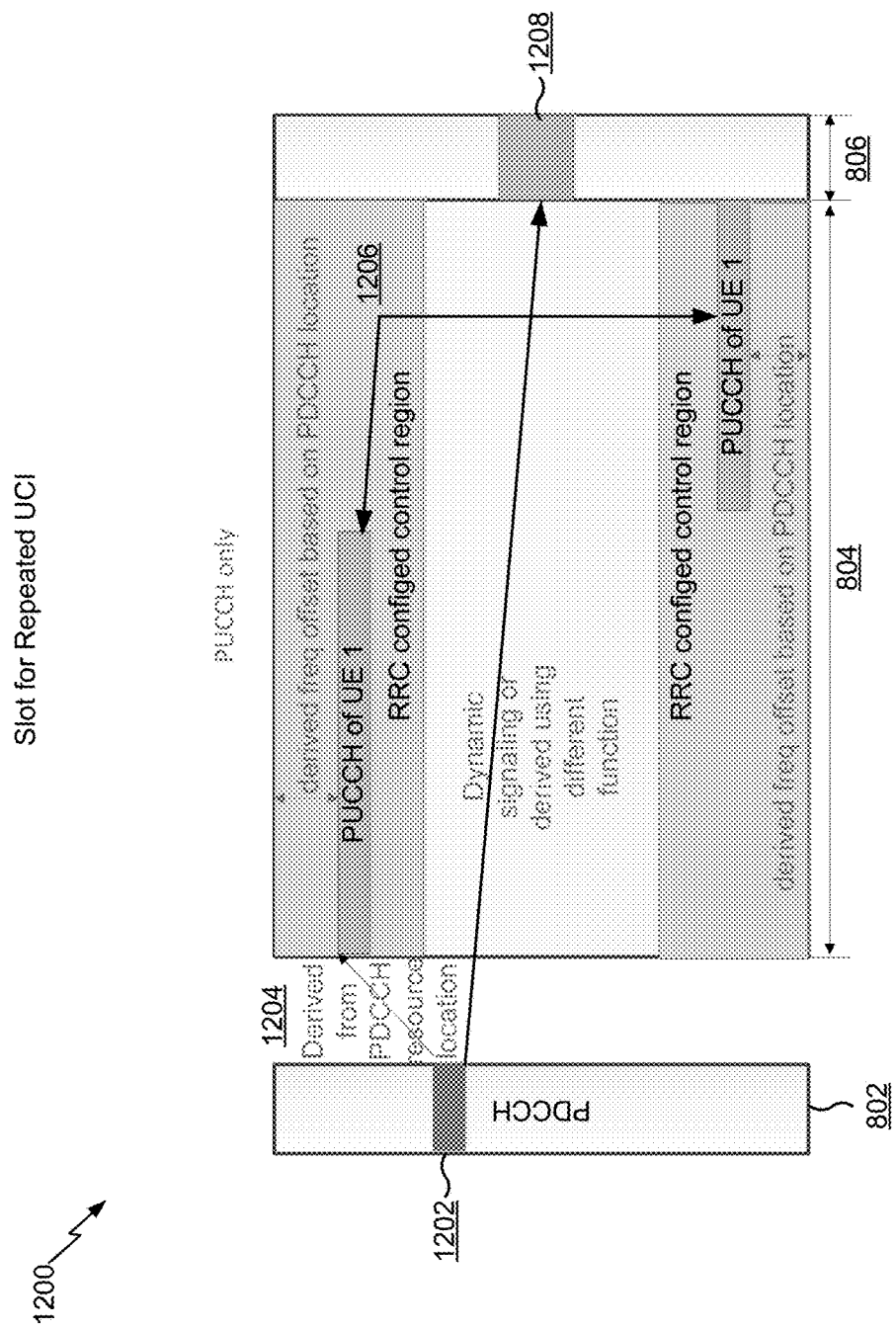
FIGS. 12A and 12B are diagrams illustrating examples of configuring transmission of corresponding uplink control information in New Radio.
Figure 12B:
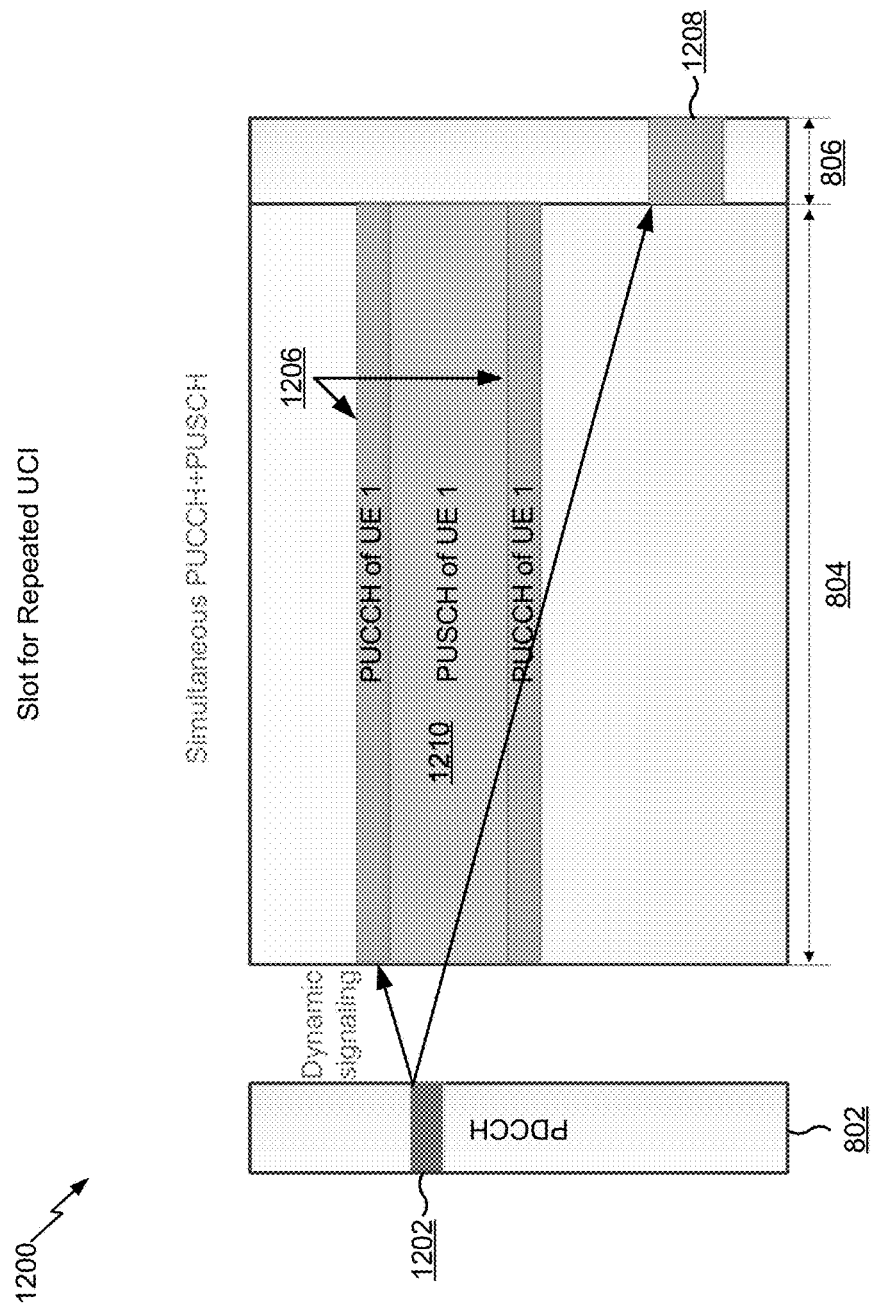

FIGS. 12A and 12B are diagrams illustrating examples 1200 of configuring transmission of corresponding UCI in New Radio. FIGS. 12A and 12B show examples where first UCI and second UCI are repeated UCI, and are transmitted in a same UL-centric slot. For example, the UE may repeat the first UCI to generate the second UCI (e.g., by copying bits of the first UCI). The UL-centric slot may include the DL control portion 802, the UL long burst portion 804, and the UL short burst portion 806, as described above in connection with FIG. 8. The UL-centric slot may be used for communication between a UE (the UE 120 of FIG. 1 and/or the like) and a base station (e.g., the base station 110 of FIG. 1 and/or the like).

As shown in FIG. 12A, the UE may receive an UL control configuration indication 1202 in the DL control portion 802 of the UL-centric slot. The UE may configure a PUCCH on the UL long burst portion 804 and the UL short burst portion 806 of the UL-centric slot based at least in part on the UL control configuration indication 1202. In some aspects, the UE may transmit the first UCI on the PUCCH configured on the UL long burst portion 804, and may transmit the second UCI on the PUCCH configured on the UL short burst portion 806.

In some aspects, the UE may configure the PUCCH on one or more frequency bands. As shown by reference number 1204, in some aspects, the one or more frequency bands may be derived from a characteristic associated with reception of the UL control configuration indication 1202 and/or may be signaled in the UL control configuration indication 1202, as described above in connection with FIGS. 11A and 11B.

In some aspects, the one or more frequency bands may include one or more first frequency bands 1206 in the UL long burst portion 804 and one or more second frequency bands 1208 in the UL short burst portion 806. In some aspects, the first frequency band(s) 1206 may be different from the second frequency band(s) 1208, which may increase a likelihood of successful reception and decoding of the UCI using frequency diversity when one of the frequency band(s) is experiencing poor performance. In some aspects, the first frequency band(s) 1206 may be the same as the second frequency band(s) 1208, which may increase a likelihood of successful reception and decoding when the frequency band used for the PUCCH is experiencing good performance. In some aspects, the UE may determine the first frequency band(s) 1206 and the second frequency band(s) 1208 in a similar manner as determining multiple frequency bands, as described above in connection with FIGS. 11A and 11B.

In some aspects, the first frequency band(s) 1206 and the second frequency band(s) 1208 may both be signaled in the UL control configuration indication 1202. In some aspects, one of the first frequency band(s) 1206 and the second frequency band(s) 1208 may be signaled in the UL control configuration indication 1202, and the other may be determined by applying a frequency offset to the signaled frequency band(s).

In some aspects, the first frequency band(s) 1206 and the second frequency band(s) 1208 may both be derived from a characteristic of the UL control configuration indication 1202. In this case, the UE may apply a first function to the characteristic to determine the first frequency band(s) 1206, and may apply a second function to the characteristic to determine the second frequency band(s) 1208. Additionally, or alternatively, the UE may apply a function to determine one of the first frequency band(s) 1206 and the second frequency band(s) 1208, and may determine the other may by applying a frequency offset to the derived frequency band(s). In some aspects, one of the first frequency band(s) 1206 and the second frequency band(s) 1208 may be signaled in the UL control configuration indication 1202, and the other may be derived from a characteristic of the UL control configuration indication 1202.

As further shown, in some aspects, the UE may configure the PUCCH on different frequency bands during different time periods. In this case, the UE may transmit the first UCI using first frequency band(s) 1206 at a first time period (e.g., during the UL long burst portion 804), and may transmit the second UCI using second frequency band(s) 1208 at a second time period (e.g., during the UL short burst portion 806). In some aspects, the time periods may not overlap, as shown. In this way, the UE may use frequency diversity to increase a likelihood of successful reception and decoding of the UCI by a base station.

As shown in FIG. 12B, in some aspects, the UE may configure the PUCCH on multiple first frequency bands 1206 in the UL long burst portion 804, and may concurrently transmit UCI on the multiple first frequency bands 1206. In some aspects, the UE may transmit the first UCI on the PUCCH configured on the UL long burst portion 804, and may transmit the second UCI (e.g., a repeat of the first UCI) on the PUCCH configured on the UL short burst portion 806.

As shown by reference number 1210, in some aspects, the UE may configure a PUSCH on the UL long burst portion 804 (and/or the UL short burst portion 806, not shown), as described above in connection with FIG. 11B. In this way, the UE may increase uplink throughput using concurrent transmissions.

As indicated above, FIGS. 12A and 12B are provided as examples. Other examples are possible and may differ from what was described with respect to FIGS. 12A and 12B.

Figure 13A:
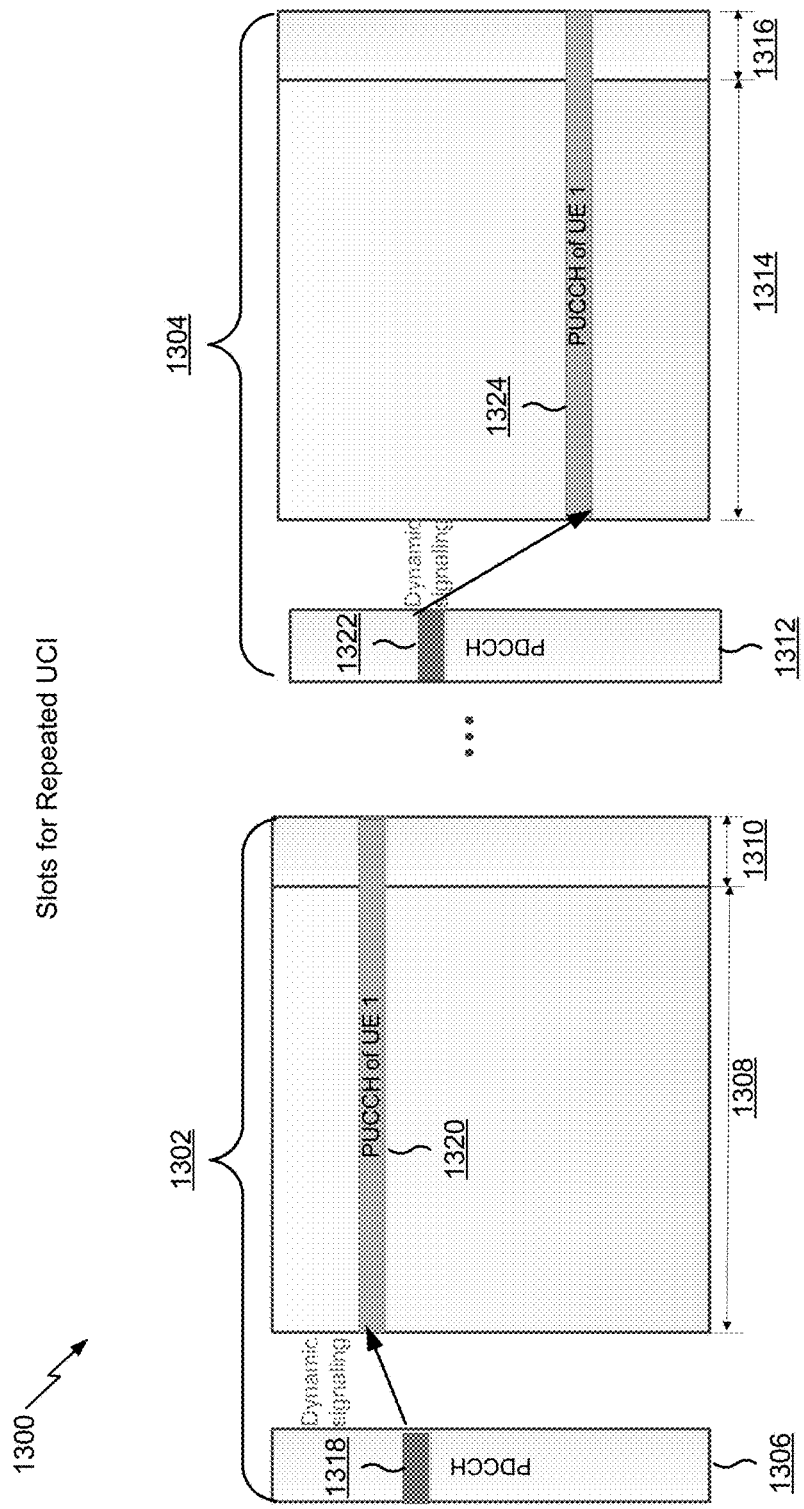
FIGS. 13A and 13B are diagrams illustrating examples of configuring transmission of corresponding uplink control information in New Radio.
Figure 13B:
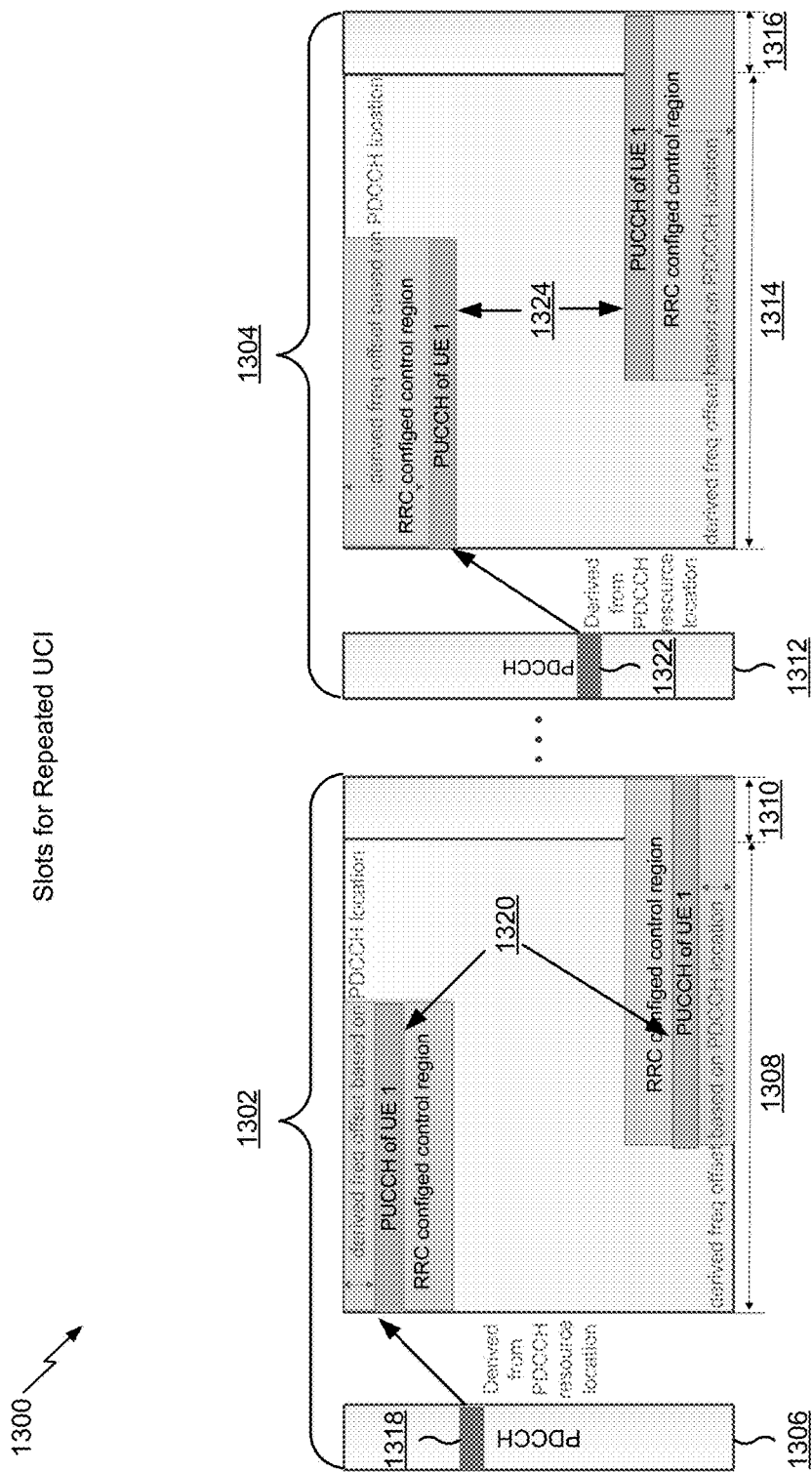

FIGS. 13A and 13B are diagrams illustrating examples 1300 of configuring transmission of corresponding UCI in New Radio. FIGS. 13A and 13B show examples where first UCI and second UCI are repeated UCI, and are transmitted in different UL-centric slots, shown as a first UL-centric slot 1302 and a second UL-centric slot 1304. For example, the UE may repeat the first UCI to generate the second UCI (e.g., by copying bits of the first UCI). The UL-centric slots may each include a DL control portion 802, an UL long burst portion 804, and an UL short burst portion 806, as described above in connection with FIG. 8. For example, the first UL-centric slot 1302 may include a first DL control portion 1306, a first UL long burst portion 1308, and a first UL short burst portion 1310, and the second UL-centric slot 1304 may include a second DL control portion 1312, a second UL long burst portion 1314, and a second UL short burst portion 1316. The UL-centric slots may be used for communication between a UE (the UE 120 of FIG. 1 and/or the like) and a base station (e.g., the base station 110 of FIG. 1 and/or the like).

As shown in FIG. 13A, the UE may receive a first UL control configuration indication 1318 in the first DL control portion 1306 of the first UL-centric slot 1302. The UE may configure a PUCCH on one or more first frequency bands 1320 of the first UL-centric slot 1302 based at least in part on the first UL control configuration indication 1318. For example, the UE may configure the first frequency band(s) 1320 on the first UL long burst portion 1308 and/or the first UL short burst portion 1310 of the first UL-centric slot 1302. In some aspects, the UE may transmit the first UCI on the PUCCH configured on the first UL long burst portion 1308 and/or the first UL short burst portion 1310.

As further shown, the UE may receive a second UL control configuration indication 1322 in the second DL control portion 1312 of the second UL-centric slot 1304. The UE may configure a PUCCH on one or more second frequency bands 1324 of the second UL-centric slot 1304 based at least in part on the second UL control configuration indication 1322. For example, the UE may configure the second frequency band(s) 1324 on the second UL long burst portion 1314 and/or the second UL short burst portion 1316 of the second UL-centric slot 1304. In some aspects, the UE may transmit the second UCI on the PUCCH configured on the second UL long burst portion 1314 and/or the second UL short burst portion 1316.

In some aspects, the first frequency band(s) 1320 may be different from the second frequency band(s) 1324, which may increase a likelihood of successful reception and decoding of the UCI using frequency diversity when one of the frequency band(s) is experiencing poor performance. In some aspects, the first frequency band(s) 1320 may be the same as the second frequency band(s) 1324, which may increase a likelihood of successful reception and decoding when the frequency band used for the PUCCH is experiencing good performance.

In some aspects, the UE may determine the first frequency band(s) 1320 based at least in part on the first UL control configuration indication 1318. For example, the first frequency band(s) 1320 may be signaled in the first UL control configuration indication 1318, as described elsewhere herein. Additionally, or alternatively, the first frequency band(s) 1320 may be derived based at least in part on a characteristic of the first UL control configuration indication 1318, as described elsewhere herein.

Similarly, the UE may determine the second frequency band(s) 1324 based at least in part on the second UL control configuration indication 1322. For example, the second frequency band(s) 1324 may be signaled in the second UL control configuration indication 1322, as described elsewhere herein. Additionally, or alternatively, the second frequency band(s) 1324 may be derived based at least in part on a characteristic of the second UL control configuration indication 1322, as described elsewhere herein.

By determining the first frequency band(s) 1320 using the first UL control configuration indication 1318 and determining the second frequency band(s) 1324 using the second UL control configuration indication 1322, the UE permits early termination of UCI transmission (e.g., by not transmitting the second UCI in the second slot). For example, the UE may transmit the first UCI in the first UL-centric slot 1302, and may receive an indication (e.g., from a base station) that the first UCI was successfully received and/or decoded. For example, the UE may receive the indication in the second DL control portion 1312 of the second UL-centric slot 1304. In this case, the UE may not transmit the second UCI in the second UL-centric slot 1304, thereby conserving network resources.

In some aspects, the first UL-centric slot 1302 and the second UL-centric slot 1304 are contiguous. This may conserve memory resources of the UE because repeated UCI can be stored for a shorter time period as compared to transmitting repeated UCI in non-contiguous slots. In some aspects, the first UL-centric slot 1302 and the second UL-centric slot 1304 are non-contiguous. This may increase the likelihood of successful reception of the repeated UCI, as channel conditions may improve as more time passes between non-contiguous slots. In some aspects, the first UL control configuration indication 1318 may indicate whether repeated UCI (e.g., the first UCI, the second UCI, and/or other UCI that is repeated) is to be repeated in contiguous slots or non-contiguous slots, and the UE may configure one or more slots for transmission of repeated UCI based at least in part on the indication. Additionally, or alternatively, the first UL control configuration indication 1318 may indicate a slot pattern for transmission of repeated UCI (e.g., a pattern of every other slot, a pattern of two contiguous slots for repeated UCI followed by one non-contiguous slot, etc.).

Additionally, or alternatively, the first UL control configuration indication 1318 may indicate a number of slots over which UCI is to be repeated. While the examples described herein show UCI as being repeated over two slots (e.g., using first UCI and second UCI), in some aspects, the UCI may be repeated over three slots (e.g., using first UCI, second UCI, and third UCI), four slots (e.g., using first UCI, second UCI, third UCI, and fourth UCI), or more slots.

As shown in FIG. 13B, the one or more first frequency bands 1320 in the first UL-centric slot 1302 may include multiple frequency bands, which may be determined as described elsewhere herein. Similarly, the one or more second frequency bands 1324 in the second UL-centric slot 1304 may include multiple frequency bands, which may be determined as described elsewhere herein. By using multiple frequency bands in each of multiple slots, the UE further increases the likelihood of successful reception and decoding of the UCI (e.g., as compared to using a single frequency band in each of multiple slots, as shown in FIG. 13A). However, using a single frequency band in each of multiple slots may reduce complexity and conserve UE resources.

As indicated above, FIGS. 13A and 13B are provided as examples. Other examples are possible and may differ from what was described with respect to FIGS. 13A and 13B.

Figure 14A:
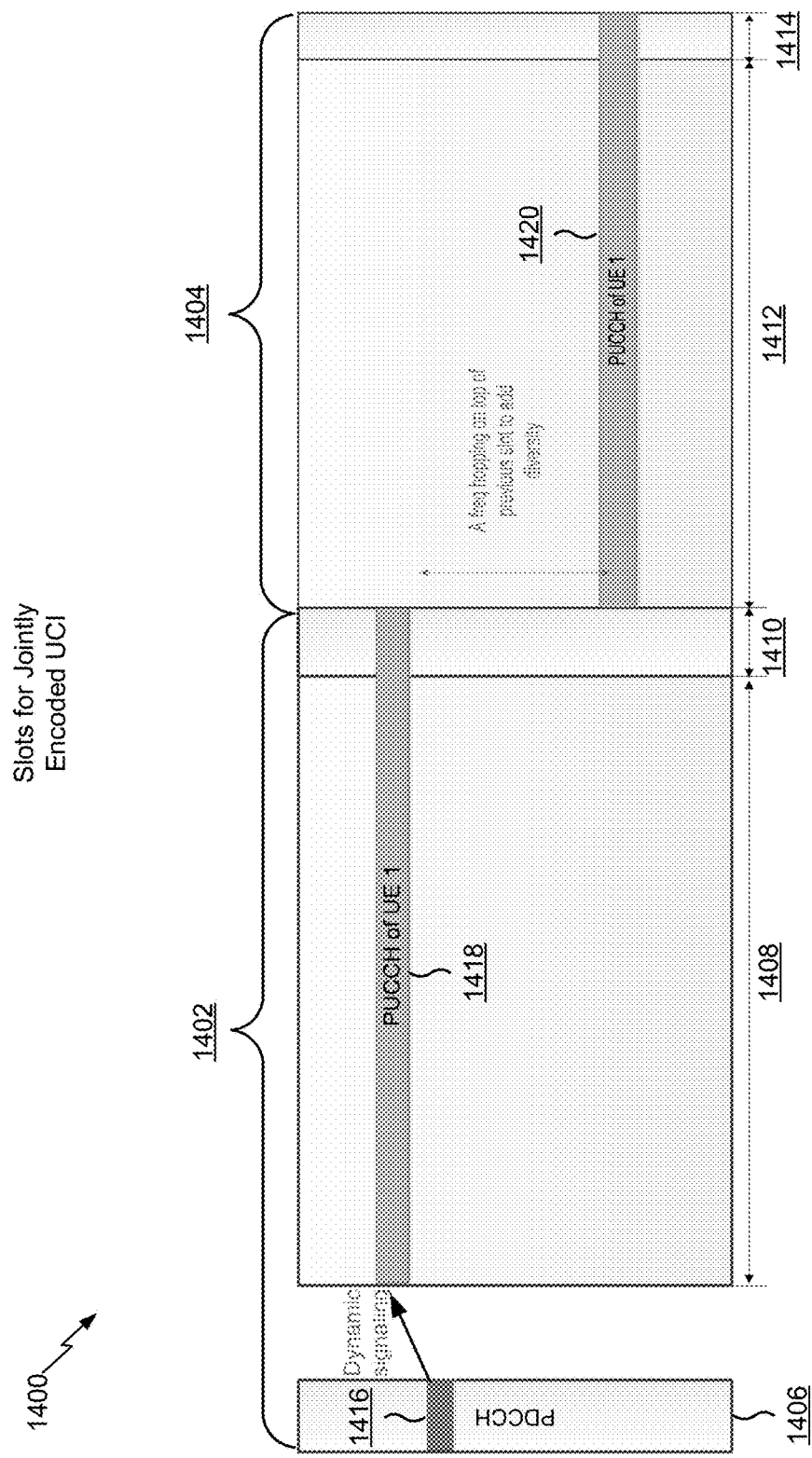
FIGS. 14A and 14B are diagrams illustrating examples of configuring transmission of corresponding uplink control information in New Radio.
Figure 14B:
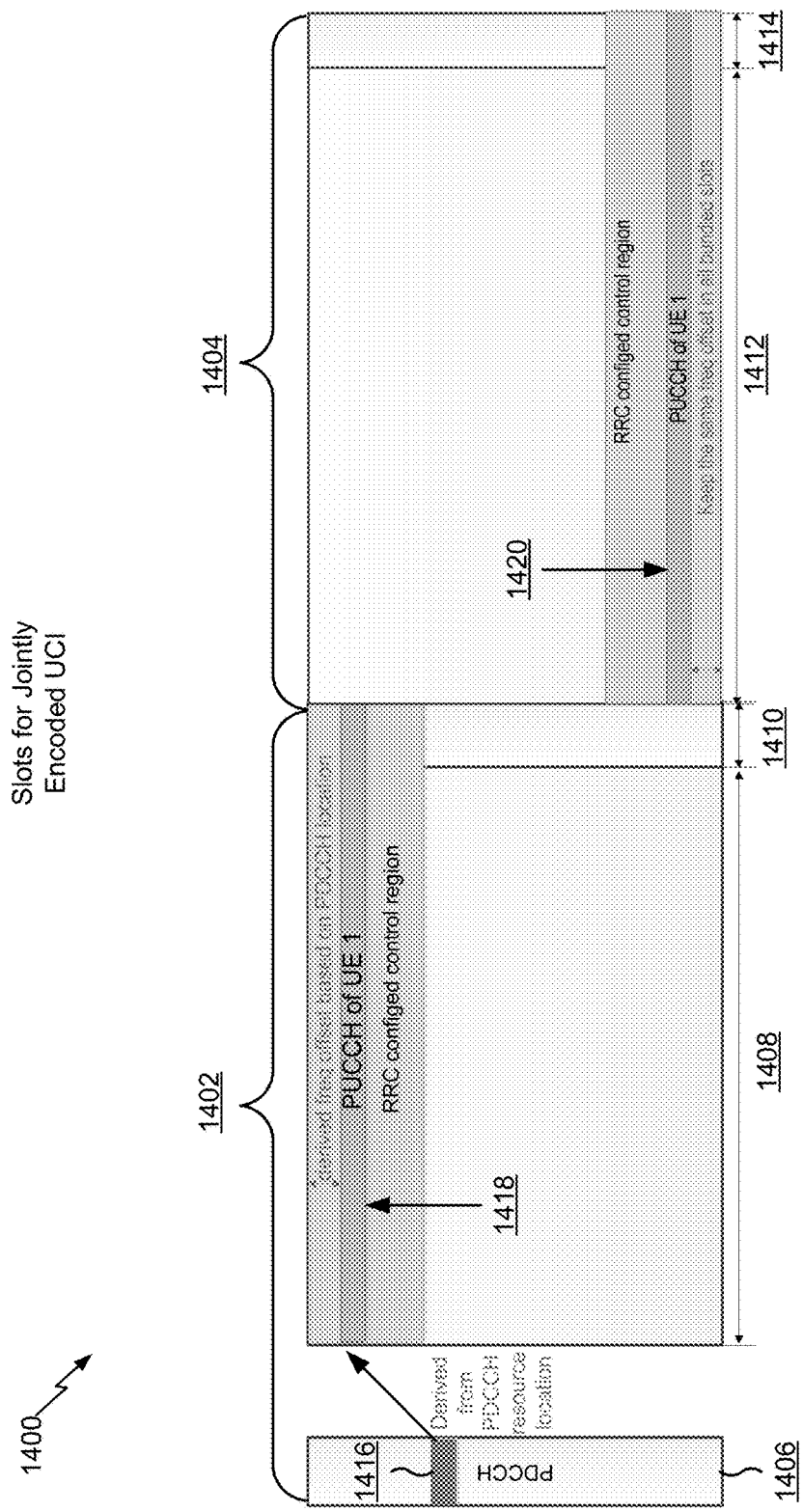

FIGS. 14A and 14B are diagrams illustrating examples 1400 of configuring transmission of corresponding UCI in New Radio. FIGS. 14A and 14B show examples where first UCI and second UCI are jointly encoded as jointly encoded UCI, and the jointly encoded UCI is transmitted in different slots, shown as a first slot 1402 and a second slot 1404. In example 1400, the first slot 1402 is an UL-centric slot and the second slot 1404 is a full-UL slot. However, other types of slot combinations could be used, such as a first UL-centric slot and a second UL-centric slot.

In some aspects, the first slot 1402 may include a DL control portion 802, an UL long burst portion 804, and an UL short burst portion 806, and the second slot 1404 may include an UL long burst portion 804 and an UL short burst portion 806, as described above in connection with FIG. 8. For example, the first slot 1402 may include a DL control portion 1406, a first UL long burst portion 1408, and a first UL short burst portion 1410, and the second slot 1404 may include a second UL long burst portion 1412, and a second UL short burst portion 1414. The slots may be used for communication between a UE (the UE 120 of FIG. 1 and/or the like) and a base station (e.g., the base station 110 of FIG. 1 and/or the like).

As shown in FIG. 14A, the UE may receive an UL control configuration indication 1416 in the first DL control portion 1406 of the first slot 1402. The UE may configure a PUCCH on one or more first frequency bands 1418 of the first slot 1402 and one or more second frequency bands 1420 of the second slot 1404 based at least in part on the UL control configuration indication 1416. For example, the UE may configure the first frequency band(s) 1418 on the first UL long burst portion 1408 and/or the first UL short burst portion 1410 of the first slot 1402, and may configure the second frequency band(s) 1420 on the second UL long burst portion 1412 and/or the second UL short burst portion 1414 of the second slot 1404. In some aspects, the UE may transmit the jointly encoded UCI on the PUCCH configured on the first frequency band(s) 1418 and the second frequency band(s) 1420.

In some aspects, the first frequency band(s) 1418 may be different from the second frequency band(s) 1420, as described elsewhere herein. In some aspects, the first frequency band(s) 1418 may be the same as the second frequency band(s) 1420, as described elsewhere herein.

In some aspects, the UE may determine the first frequency band(s) 1418 and the second frequency band(s) 1420 based at least in part on the UL control configuration indication 1416, as described elsewhere herein. For example, the first frequency band(s) 1418 and/or the second frequency band(s) 1420 may be signaled in the UL control configuration indication 1416, as described elsewhere herein. Additionally, or alternatively, the first frequency band(s) 1418 and/or the second frequency band(s) 1420 may be derived based at least in part on a characteristic of the UL control configuration indication 1416, as described elsewhere herein. For example, and as shown in FIG. 14A, the first frequency band(s) 1418 may be signaled in the UL control configuration indication 1416, and the UE may apply frequency hopping to the first frequency band(s) 1418 to determine the second frequency band(s) 1420 (e.g., which are offset from the first frequency band(s) 1418).

When both the first frequency band(s) 1418 and the second frequency band(s) 1420 are determined using the UL control configuration indication 1416, the second slot 1404 may be configured not to include a DL control portion 802, thereby extending a length for uplink transmission (e.g., extending a length of the UL long burst portion 1412 and/or the UL short burst portion 1414 to fill the second slot 1404) and increasing uplink throughput. In some aspects, the first slot 1402 and the second slot 1404 are contiguous so that the jointly encoded UCI can be transmitted in contiguous slots using a single DL control portion 1406 (e.g., a single UL control configuration indication 1416). In some aspects, the UL control configuration indication 1416 may indicate that jointly encoded UCI is to be transmitted in contiguous slots, and the UE may configure one or more slots for transmission of jointly encoded UCI based at least in part on the indication. Additionally, or alternatively, the UL control configuration indication 1416 may indicate a slot pattern for transmission of jointly encoded UCI, as described elsewhere herein.

Additionally, or alternatively, the UL control configuration indication 1416 may indicate a configuration for the first slot 1402 and/or the second slot 1404. For example, the UL control configuration indication 1416 may indicate that the second slot 1404 is to exclude a DL control portion 802, that the UL long burst portion 1412 and/or the UL short burst portion 1414 is to be extended in the second slot 1404, and/or the like. Additionally, or alternatively, the UL control configuration indication 1416 may indicate a number of slots over which UCI is to be jointly encoded. While the examples described herein show UCI as being jointly encoded over two slots, in some aspects, the UCI may be jointly encoded over three slots, four slots, or more slots.

As shown in FIG. 14B, in some aspects, the UE may determine a frequency offset based at least in part on the UL control configuration indication 1416 (e.g., the frequency offset may be signaled or derived), and may use the frequency offset to determine the first frequency band(s) 1418 and the second frequency band(s) 1420. In some aspects, the UE may use the same frequency offset to determine both the first frequency band(s) 1418 and the second frequency band(s) 1420, thereby conserving UE resources that would otherwise be consumed to calculate multiple frequency offsets.

Although FIGS. 14A and 14B show the first slot 1402 and the second slot 1404 as contiguous, in some aspects, the first slot 1402 and the second slot 1404 may be non-contiguous.

In some aspects, the UL control configuration indication 1416 (e.g., in the first slot 1402) may indicate whether to transmit corresponding UCI in contiguous slots or non-contiguous slots, and the UE may configure one or more slots for transmission of the corresponding UCI based at least in part on the indication.

Additionally, or alternatively, the UL control configuration indication 1416 may indicate a number of slots to be used for transmission of corresponding UCI, may indicate a slot pattern for transmission of corresponding UCI, and/or the like.

As indicated above, FIGS. 14A and 14B are provided as examples. Other examples are possible and may differ from what was described with respect to FIGS. 14A and 14B.

Figure 15A:
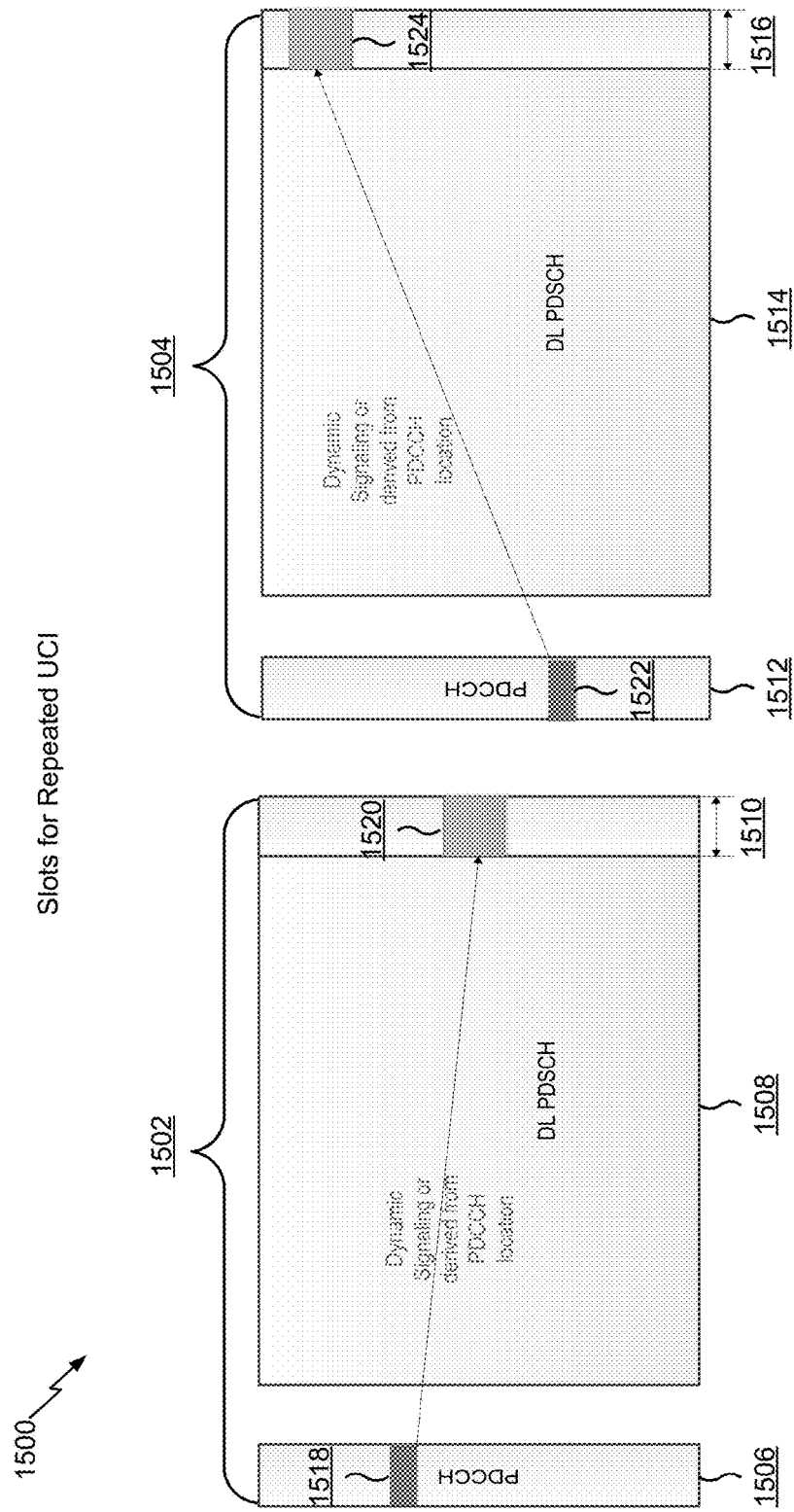
FIGS. 15A and 15B are diagrams illustrating examples of configuring transmission of corresponding uplink control information in New Radio.
Figure 15B:
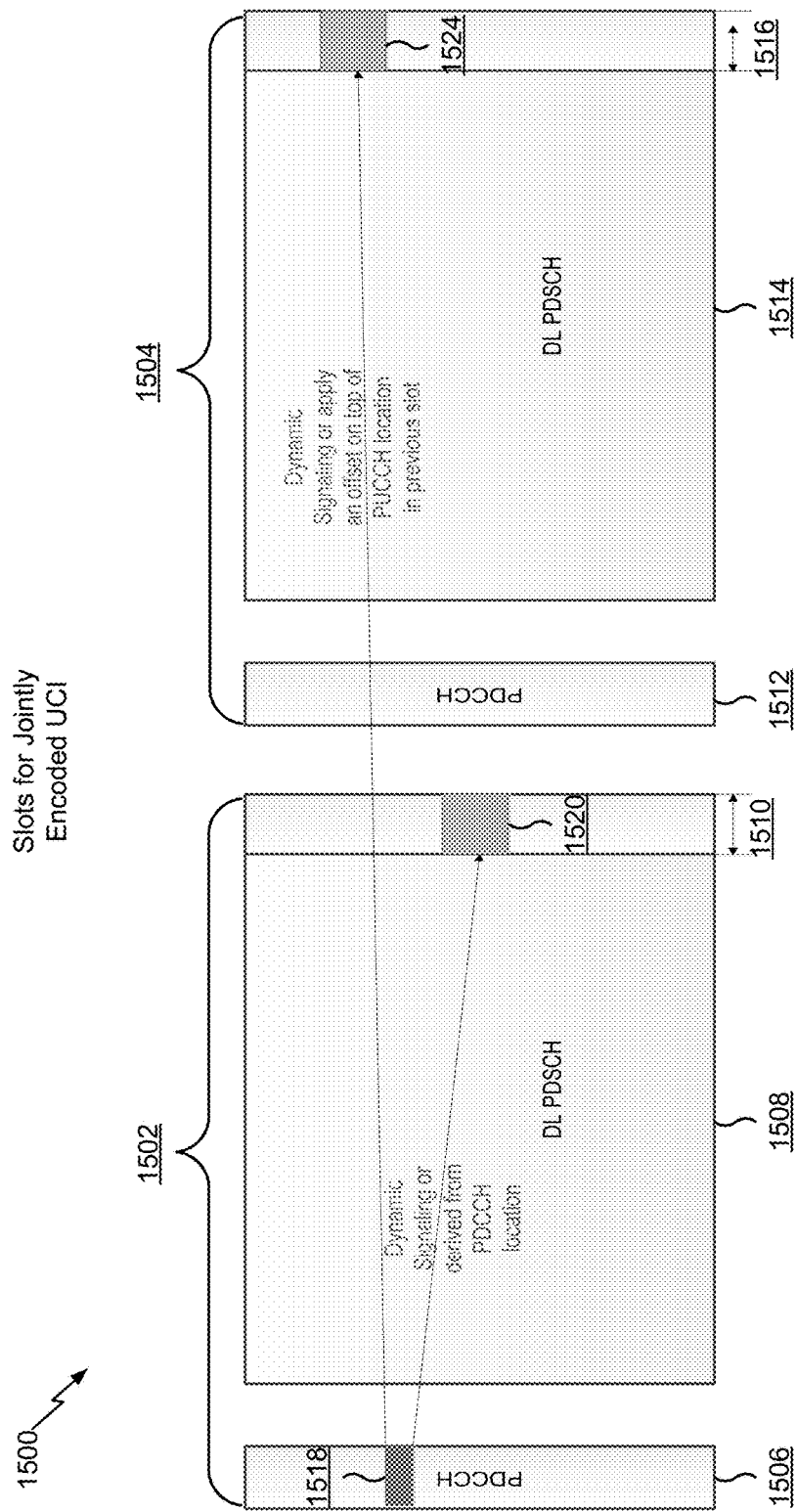

FIGS. 15A and 15B are diagrams illustrating examples 1500 of configuring transmission of corresponding UCI in New Radio. FIGS. 15A and 15B show examples where corresponding UCI (e.g., first UCI and second UCI) are transmitted in different DL-centric slots, shown as a first DL-centric slot 1502 and a second DL-centric slot 1504. The DL-centric slots may each include a DL control portion 702, a DL data portion 704, and an UL short burst portion 706, as described above in connection with FIG. 7. For example, the first DL-centric slot 1502 may include a first DL control portion 1506, a first DL data portion 1508, and a first UL short burst portion 1510, and the second DL-centric slot 1504 may include a second DL control portion 1512, a second DL data portion 1514, and a second UL short burst portion 1516. The DL-centric slots may be used for communication between a UE (the UE 120 of FIG. 1 and/or the like) and a base station (e.g., the base station 110 of FIG. 1 and/or the like).

FIG. 15A shows an example where first UCI and second UCI are repeated UCI, and are transmitted in different DL-centric slots. As shown in FIG. 15A, the UE may receive a first UL control configuration indication 1518 in the first DL control portion 1506 of the first DL-centric slot 1502. The UE may configure a PUCCH on one or more first frequency bands 1520 of the first DL-centric slot 1502 based at least in part on the first UL control configuration indication 1518. For example, the UE may configure the first frequency band(s) 1520 on the first UL short burst portion 1510 of the first DL-centric slot 1502. In some aspects, the UE may transmit the first UCI on the PUCCH configured on the first UL short burst portion 1510.

As further shown, the UE may receive a second UL control configuration indication 1522 in the second DL control portion 1512 of the second DL-centric slot 1504. The UE may configure a PUCCH on one or more second frequency bands 1524 of the second DL-centric slot 1504 based at least in part on the second UL control configuration indication 1522. For example, the UE may configure the second frequency band(s) 1524 on the second UL short burst portion 1516 of the second DL-centric slot 1504. In some aspects, the UE may transmit the second UCI on the PUCCH configured on the second UL short burst portion 1516.

In some aspects, the first frequency band(s) 1520 may be different from the second frequency band(s) 1524, as described elsewhere herein. In some aspects, the first frequency band(s) 1520 may be the same as the second frequency band(s) 1524, as described elsewhere herein.

In some aspects, the UE may determine the first frequency band(s) 1520 based at least in part on the first UL control configuration indication 1518. For example, the first frequency band(s) 1520 may be signaled or derived, as described elsewhere herein. Similarly, the UE may determine the second frequency band(s) 1524 based at least in part on the second UL control configuration indication 1522. For example, the second frequency band(s) 1524 may be signaled or derived, as described elsewhere herein. The first DL-centric slot 1502 and the second DL-centric slot 1504 may be contiguous or non-contiguous, as described elsewhere herein. Additionally, or alternatively, the first UL control configuration indication 1518 and/or the second UL control configuration indication 1522 may include one or more indications described elsewhere herein.

FIG. 15B shows an example where first UCI and second UCI are jointly encoded as jointly encoded UCI, and the jointly encoded UCI is transmitted in different DL-centric slots (e.g., the first DL-centric slot 1502 and the second DL-centric slot 1504). In some aspects, when the UCI is to be jointly encoded, the UE may receive the first UL control configuration indication 1518 in the first DL control portion 1506 of the first DL-centric slot 1502, and may not receive the second UL control configuration indication 1522 in the second DL-centric slot 1504. In this case, the UE may configure the PUCCH on the one or more first frequency bands 1520 of the first DL-centric slot 1502 and the one or more second frequency bands 1524 of the second DL-centric slot 1504 based at least in part on the first UL control configuration indication 1518. For example, the UE may configure the first frequency band(s) 1520 on the first UL short burst portion 1510 of the first DL-centric slot 1502, and may configure the second frequency band(s) 1524 on the second UL short burst portion 1516 of the second DL-centric slot 1504. In some aspects, the UE may transmit the jointly encoded UCI on the PUCCH configured on the first UL short burst portion 1510 and the second UL short burst portion 1516. The UE may determine the first frequency band(s) 1520 and/or the second frequency band(s) 1524 as described elsewhere herein.

In this way, the UE may conserve downlink resources by using one UL control configuration indication to determine both the first frequency band(s) 1520 and the second frequency band(s) 1524. Furthermore, the UE may achieve a coding gain by using joint encoding.

Although FIGS. 15A and 15B show the first DL-centric slot 1502 and the second DL-centric slot 1504 as contiguous, in some aspects, the first DL-centric slot 1502 and the second DL-centric slot 1504 may be non-contiguous. In some aspects, the first UL control configuration indication 1518 may indicate whether to transmit corresponding UCI in contiguous slots or non-contiguous slots, and the UE may configure one or more slots for transmission of the corresponding UCI based at least in part on the indication. Additionally, or alternatively, the first UL control configuration indication 1518 may indicate a number of slots to be used for transmission of corresponding UCI, may indicate a slot pattern for transmission of corresponding UCI, and/or the like.

As indicated above, FIGS. 15A and 15B are provided as examples. Other examples are possible and may differ from what was described with respect to FIGS. 15A and 15B.

Figure 16A:
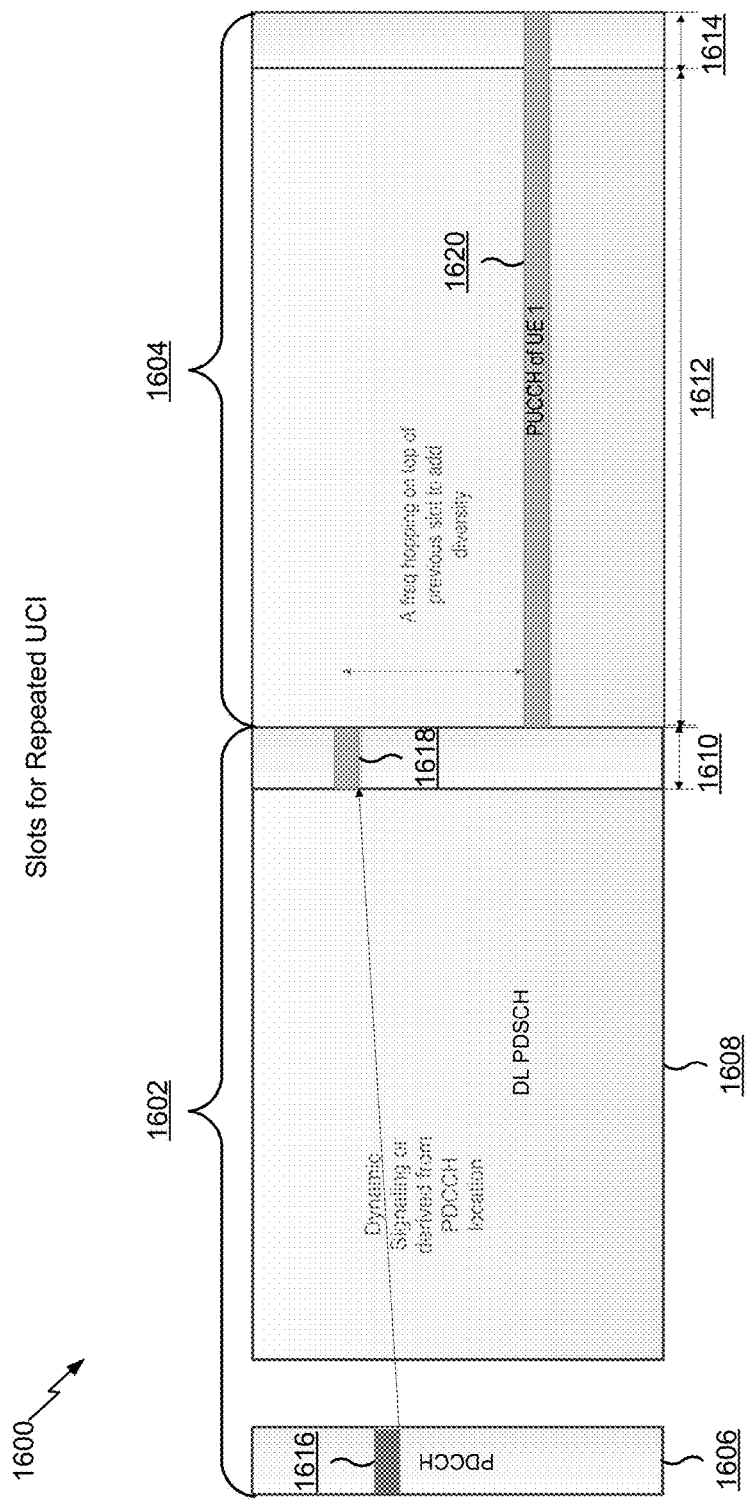
FIGS. 16A and 16B are diagrams illustrating examples of configuring transmission of corresponding uplink control information in New Radio.
Figure 16B:
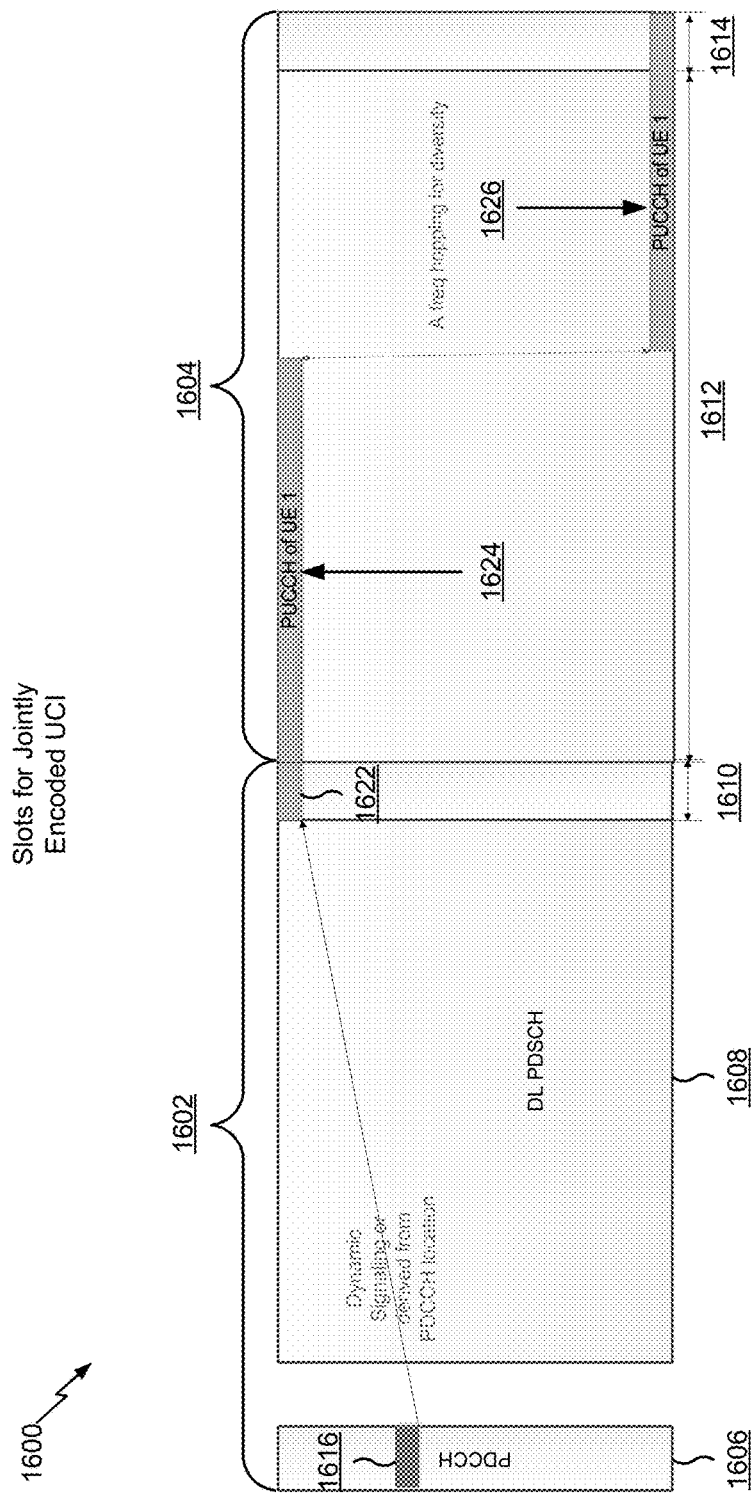

FIGS. 16A and 16B are diagrams illustrating examples 1600 of configuring transmission of corresponding UCI in New Radio. FIGS. 16A and 16B show examples where corresponding UCI (e.g., first UCI and second UCI) are transmitted in a combination of DL slots (e.g., DL-centric slots or full-DL slots) and UL slots (e.g., UL-centric slots or full-UL slots). For example, FIGS. 16A and 16B show a first slot 1602 as a DL-centric slot, and a second slot 1604 as a full-UL slot. In some aspects, other types and orderings of slots may be used. However, by using a DL-centric slot followed by a full-UL slot, the UE may increase uplink throughput by eliminating a DL control portion and a guard interval from the second slot 1604.

As shown, the first slot 1602 may be a DL-centric slot that includes a DL control portion 1606, a DL data portion 1608, and a first UL short burst portion 1610, which may correspond to portions 702, 704, and 706, respectively, as described above in connection with FIG. 7. As further shown, the second slot 1604 may be a full-UL slot that includes an UL long burst portion 1612 and a second UL short burst portion 1614, which may correspond to portions 1004 and 1006, respectively, as described above in connection with FIG. 10. The slots may be used for communication between a UE (the UE 120 of FIG. 1 and/or the like) and a base station (e.g., the base station 110 of FIG. 1 and/or the like).

FIG. 16A shows an example where first UCI and second UCI are repeated UCI, and are transmitted in different mixed slots (e.g., mixed DL and UL slots). As shown in FIG. 16A, the UE may receive an UL control configuration indication 1616 in the DL control portion 1606 of the first slot 1602. The UE may configure a PUCCH on one or more first frequency bands 1618 of the first slot 1602 and one or more second frequency bands 1620 of the second slot 1604 based at least in part on the UL control configuration indication 1616. For example, the UE may configure the first frequency band(s) 1618 on the first UL short burst portion 1610 of the first slot 1602, and may configure the second frequency band(s) 1620 on the UL long burst portion 1612 and/or the second UL short burst portion 1614 of the second slot 1604. In some aspects, the UE may transmit the first UCI on the PUCCH configured on the first frequency band(s) 1618, and may transmit the second UCI on the PUCCH configured on the second frequency band(s) 1620.

In some aspects, the first frequency band(s) 1618 may be different from the second frequency band(s) 1620, as described elsewhere herein. In some aspects, the first frequency band(s) 1618 may be the same as the second frequency band(s) 1620, as described elsewhere herein.

In some aspects, the UE may determine the first frequency band(s) 1618 and/or the second frequency band(s) 1620 based at least in part on the UL control configuration indication 1616. For example, the first frequency band(s) 1618 and/or the second frequency band(s) 1620 may be signaled or derived, as described elsewhere herein. For example, and as shown in FIG. 16A, the first frequency band(s) 1618 may be signaled in or derived from the UL control configuration indication 1616, and the UE may apply frequency hopping to the first frequency band(s) 1618 to determine the second frequency band(s) 1620.

When both the first frequency band(s) 1618 and the second frequency band(s) 1620 are determined using the UL control configuration indication 1616, the second slot 1604 may be configured not to include a DL control portion, thereby extending a length for uplink transmission (e.g., extending a length of the UL long burst portion 1612 and/or the UL short burst portion 1614 to fill the second slot 1604) and increasing uplink throughput. In some aspects, the first slot 1602 and the second slot 1604 are configured to be contiguous so that the first UCI and the second UCI can be transmitted in contiguous slots using a single DL control portion 1606 (e.g., a single UL control configuration indication 1616). In some aspects, the UL control configuration indication 1616 may indicate that repeated UCI is to be transmitted in contiguous slots, and the UE may configure one or more slots for transmission of repeated UCI based at least in part on the indication. Additionally, or alternatively, UL control configuration indication 1616 may include one or more other indications described elsewhere herein.

FIG. 16B shows an example where first UCI and second UCI are jointly encoded as jointly encoded UCI, and the jointly encoded UCI is transmitted in different mixed slots (e.g., mixed DL and UL slots). In this case, the first frequency band(s) 1618 and the second frequency band(s) 1620 may be determined in a similar manner as described above. In some aspects, the first frequency band(s) 1618 may include a first frequency 1622 and the second frequency band(s) 1620 (e.g., on the UL slot) may include multiple frequency bands for frequency diversity, shown as a second frequency 1624 and a third frequency 1626.

In some aspects, a frequency at the start of the second slot 1604 may be a same frequency as a frequency at the end of the first slot 1602. For example, the first frequency 1622 is shown as a same frequency as the second frequency 1624. In this way, the same frequency may extend across an ending boundary of the first slot 1602 and a beginning boundary of the second slot 1604 for transmission of the jointly encoded UCI, thereby reducing complexity and conserving UE resources. In this case, the first slot 1602 and the second slot 1604 may be contiguous, in some aspects.

While the first slot 1602 and the second slot 1604 are shown as a DL-centric slot and a full-UL slot, respectively, in some aspects, other types and orderings of slots may be used. For example, one of the first slot 1602 or the second slot 1604 may include a DL data portion and a first UL short burst portion, and the other one of the first slot 1602 or the second slot 1604 may include an UL long burst portion and a second UL short burst portion. When UCI is jointly encoded, the UE may transmit the jointly encoded UCI in the first UL short burst portion and at least one of the UL long burst portion or the second UL short burst portion. When UCI is repeated, the UE may transmit one of the first UCI or the second UCI in the first UL short burst portion and may transmit the other one of the first UCI or the second UCI in at least one of the UL long burst portion or the second UL short burst portion.

Furthermore, although FIGS. 16A and 16B show the first slot 1602 and the second slot 1604 as contiguous, in some aspects, the first slot 1602 and the second slot 1604 may be non-contiguous. In some aspects, the UL control configuration indication 1616 (e.g., in the first slot 1602) may indicate whether to transmit corresponding UCI in contiguous slots or non-contiguous slots, and the UE may configure one or more slots for transmission of the corresponding UCI based at least in part on the indication. Additionally, or alternatively, the UL control configuration indication 1616 may indicate a number of slots to be used for transmission of corresponding UCI, may indicate a slot pattern for transmission of corresponding UCI, and/or the like.

In some aspects, the UE may determine whether to repeat UCI or jointly encode UCI based at least in part on a size of a payload of UCI that includes the first UCI and the second UCI. Additionally, or alternatively, the UE may determine whether to repeat UCI or jointly encode UCI based at least in part on a number of slots to be used to transmit the payload of UCI. For example, the UE may repeat UCI when a payload of UCI, including the first UCI and the second UCI, has a size that is less than or equal to a threshold (e.g., is less than 8 bits). Additionally, or alternatively, the UE may repeat UCI when a number of slots to be used to transmit a payload of UCI, including the first UCI and the second UCI, is greater than or equal to a threshold (e.g., is greater than 2 slots). Additionally, or alternatively, the UE may jointly encode UCI when a payload of UCI, including the first UCI and the second UCI, has a size that is greater than or equal to a threshold (e.g., is greater than or equal to 8 bits). Additionally, or alternatively, the UE may jointly encode UCI when a number of slots to be used to transmit a payload of UCI, including the first UCI and the second UCI, is less than or equal to a threshold (e.g., is less than or equal to 2 slots).

As indicated above, FIGS. 16A and 16B are provided as examples. Other examples are possible and may differ from what was described with respect to FIGS. 16A and 16B.

Figure 17:
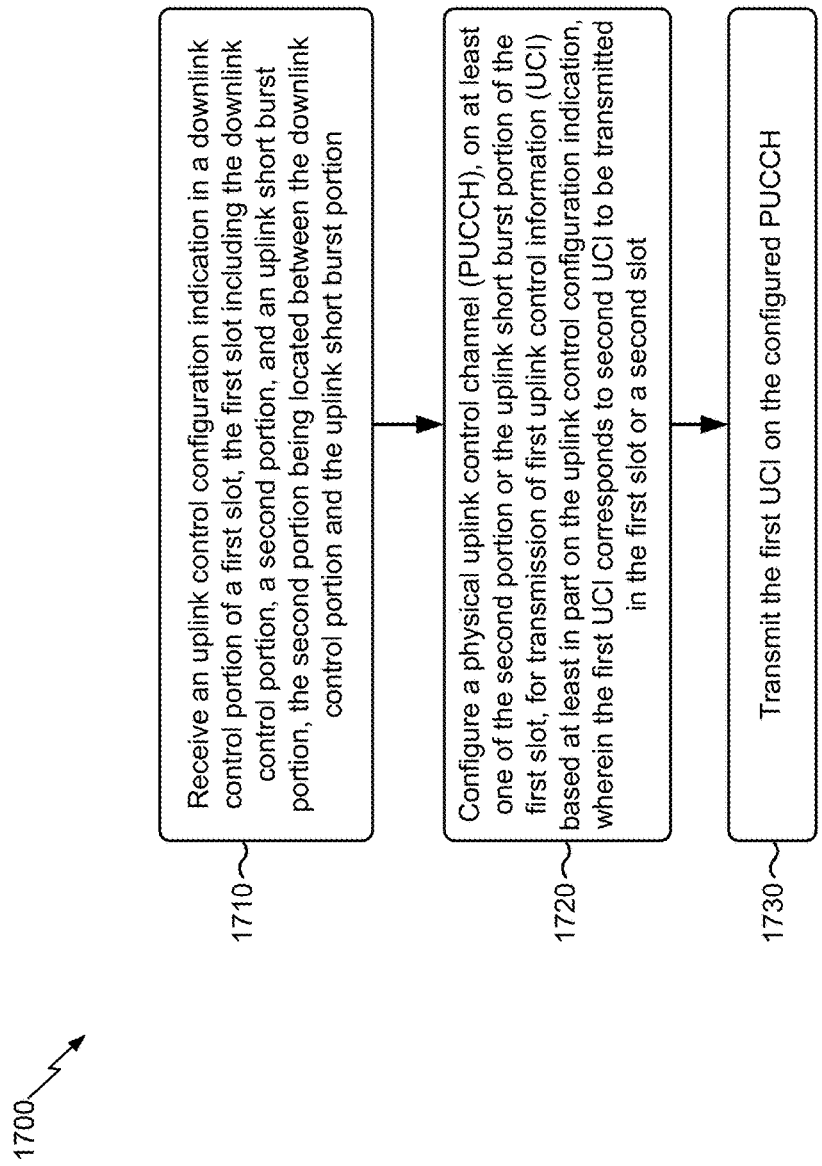
FIG. 17 is a flow chart of a method of wireless communication.

FIG. 17 is a flow chart 1700 of a method of wireless communication. The method may be performed by a UE (e.g., the UE 120 of FIG. 1, the apparatus 1902/1902' of FIGS. 19-20, and/or the like).

At 1710, the UE may receive an uplink control configuration indication in a downlink control portion of a first slot, the first slot including the downlink control portion, a second portion, and an uplink short burst portion, the second portion being located between the downlink control portion and the uplink short burst portion. In some aspects, the UE receives an uplink control configuration indication in a downlink control portion of a first slot. In some aspects, the first slot includes the downlink control portion, a second portion, and an uplink short burst portion. In some aspects, the second portion is located between the downlink control portion and the uplink short burst portion. The uplink control configuration indication, the first slot, and the portions of the first slot are described in more detail above in connection with FIGS. 7-16B.

At 1720, the UE may configure a physical uplink control channel (PUCCH), on at least one of the second portion or the uplink short burst portion of the first slot, for transmission of first uplink control information (UCI) based at least in part on the uplink control configuration indication, wherein the first UCI corresponds to second UCI to be transmitted in the first slot or a second slot. In some aspects, the UE configures a PUCCH on at least one of the second portion or the uplink short burst portion of the first slot based at least in part on the uplink control configuration indication. In some aspects, the UE configures the PUCCH for transmission of UCI. In some aspects, the first UCI correspond to second UCI to be transmitted in the first slot or a second slot. The configuration, the PUCCH, the first UCI, the second UCI, and the second slot are described in more detail above in connection with FIGS. 7-16B.

At 1730, the UE may transmit the first UCI on the configured PUCCH. In some aspects, the UE transmits the first UCI on the configured PUCCH. The transmission is described in more detail above in connection with FIGS. 7-16B.

In some aspects, the second portion is an uplink long burst portion and the first UCI and the second UCI are transmitted in the first slot. In some aspects, the PUCCH is configured on both the uplink long burst portion and the uplink short burst portion. In some aspects, the first UCI and the second UCI are jointly encoded as jointly encoded UCI. In some aspects, the uplink control configuration indication indicates whether the PUCCH is to be configured in only the uplink long burst portion or in both the uplink long burst portion and the uplink short burst portion. In some aspects, one or more bits of the jointly encoded UCI are truncated when the uplink control configuration indication indicates that the PUCCH is to be configured in only the uplink long burst portion. In some aspects, one or more bits of the jointly encoded UCI are repeated and transmitted in the uplink short burst portion when the uplink control configuration indication indicates that the PUCCH is to be configured in both the uplink long burst portion and the uplink short burst portion.

In some aspects, the second UCI is a repeat of the first UCI, the first UCI is transmitted in the uplink long burst portion of the first slot, and the second UCI is transmitted in the uplink short burst portion of the first slot. In some aspects, the PUCCH is configured on one or more frequency bands signaled in the uplink control configuration indication or derived from a characteristic associated with reception of the uplink control configuration indication. In some aspects, the characteristic is a frequency band used for reception of the uplink control configuration indication. In some aspects, the one or more frequency bands include one or more first frequency bands in the uplink long burst portion and one or more second frequency bands in the uplink short burst portion. In some aspects, the one or more first frequency bands are different from the one or more second frequency bands. In some aspects, a physical uplink shared channel (PUSCH) is configured on at least one of the uplink long burst portion or the uplink short burst portion for transmission of content concurrently with transmission of at least one of the first UCI or the second UCI.

In some aspects, the second UCI is a repeat of the first UCI and the PUCCH is configured on one or more first frequency bands of the first slot for transmission of the first UCI and one or more second frequency bands of the second slot for transmission of the second UCI. In some aspects, the one or more first frequency bands are different from the one or more second frequency bands. In some aspects, the one or more first frequency bands are determined based at least in part on the uplink control configuration indication received in the downlink control portion of the first slot, and the one or more second frequency bands are determined based at least in part on a different uplink control configuration indication received in a downlink control portion of the second slot. In some aspects, the second UCI is not transmitted based at least in part on receiving an indication that the first UCI was successfully decoded by a base station. In some aspects, the one or more first frequency bands and the one or more second frequency bands are determined based at least in part on the uplink control configuration indication received in the downlink control portion of the first slot.

In some aspects, the downlink control portion of the first slot is a first downlink control portion, the second portion of the first slot is a first uplink long burst portion, and the uplink short burst portion of the first slot is a first uplink short burst portion, and the second slot includes a second downlink control portion, a second uplink long burst portion, and a second uplink short burst portion. In some aspects, the first UCI is transmitted in at least one of the first uplink long burst portion or the first uplink short burst portion of the first slot, and the second UCI is transmitted in at least one of the second uplink long burst portion or the second uplink short burst portion of the second slot.

In some aspects, the downlink control portion of the first slot is a first downlink control portion, the second portion of the first slot is a first downlink data portion, and the uplink short burst portion of the first slot is a first uplink short burst portion, and the second slot includes a second downlink control portion, a second downlink data portion, and a second uplink short burst portion. In some aspects, the first UCI is transmitted in the first uplink short burst portion of the first slot, and the second UCI is transmitted in the second uplink short burst portion of the second slot.

In some aspects, one of the first slot or the second slot includes a downlink data portion and a first uplink short burst portion and the other one of the first slot or the second slot includes an uplink long burst portion and a second uplink short burst portion, and one of the first UCI or the second UCI is transmitted in the first uplink short burst portion and the other one of the first UCI or the second UCI is transmitted in at least one of the uplink long burst portion or the second uplink short burst portion.

In some aspects, the first UCI and the second UCI are jointly encoded as jointly encoded UCI, and the PUCCH is configured on one or more first frequency bands of the first slot and one or more second frequency bands of the second slot for transmission of the jointly encoded UCI. In some aspects, the one or more first frequency bands are different from the one or more second frequency bands. In some aspects, the one or more first frequency bands are determined based at least in part on the uplink control configuration indication received in the downlink control portion of the first slot, and the one or more second frequency bands are determined based at least in part on a different uplink control configuration indication received in a downlink control portion of the second slot. In some aspects, the one or more first frequency bands and the one or more second frequency bands are determined based at least in part on the uplink control configuration indication received in the downlink control portion of the first slot. In some aspects, the one or more first frequency bands and the one or more second frequency bands are determined based at least in part on a frequency offset derived from a characteristic associated with reception of the uplink control configuration indication.

In some aspects, the second portion of the first slot is a first uplink long burst portion and the uplink short burst portion of the first slot is a first uplink short burst portion, and the second slot includes a second uplink long burst portion and a second uplink short burst portion. In some aspects, the second slot does not include a downlink control portion. In some aspects, the jointly encoded UCI is transmitted in at least one of the first uplink long burst portion or the first uplink short burst portion of the first slot and at least one of the second uplink long burst portion or the second uplink short burst portion of the second slot.

In some aspects, the downlink control portion of the first slot is a first downlink control portion, the second portion of the first slot is a first downlink data portion, and the uplink short burst portion of the first slot is a first uplink short burst portion, and the second slot includes a second downlink control portion, a second downlink data portion, and a second uplink short burst portion. In some aspects, the jointly encoded UCI is transmitted in the first uplink short burst portion of the first slot and the second uplink short burst portion of the second slot.

In some aspects, one of the first slot or the second slot includes a downlink data portion and a first uplink short burst portion and the other one of the first slot or the second slot includes an uplink long burst portion and a second uplink short burst portion, and the jointly encoded UCI is transmitted in the first uplink short burst portion and at least one of the uplink long burst portion or the second uplink short burst portion. In some aspects, the first slot and the second slot are contiguous. In some aspects, the first slot and the second slot are non-contiguous. In some aspects, the uplink control configuration indication indicates at least one of: a number of slots in which UCI is to be repeated or jointly encoded, whether the first UCI and the second UCI are to be repeated or jointly encoded in contiguous slots or non-contiguous slots, a slot pattern for transmission of the repeated UCI or jointly encoded UCI, whether the second slot is to be configured to include a downlink control portion, or some combination thereof.

In some aspects, the first UCI and the second UCI are configured to be repeated UCI when a payload of UCI, including the first UCI and the second UCI, has a size that is less than or equal to a threshold. In some aspects, the first UCI and the second UCI are configured to be jointly encoded UCI when a payload of UCI, including the first UCI and the second UCI, has a size that is greater than or equal to a threshold. In some aspects, the first UCI and the second UCI are configured to be jointly encoded UCI when a number of slots to be used to transmit a payload of UCI, including the first UCI and the second UCI, is less than or equal to a threshold. In some aspects, the first UCI and the second UCI are configured to be repeated UCI when a number of slots to be used to transmit a payload of UCI, including the first UCI and the second UCI, is greater than or equal to a threshold.

Although FIG. 17 shows example blocks of a method of wireless communication, in some aspects, the method may include additional blocks, fewer blocks, different blocks, or differently arranged blocks than those shown in FIG. 17. Additionally, or alternatively, two or more blocks shown in FIG. 17 may be performed in parallel.

Figure 18:
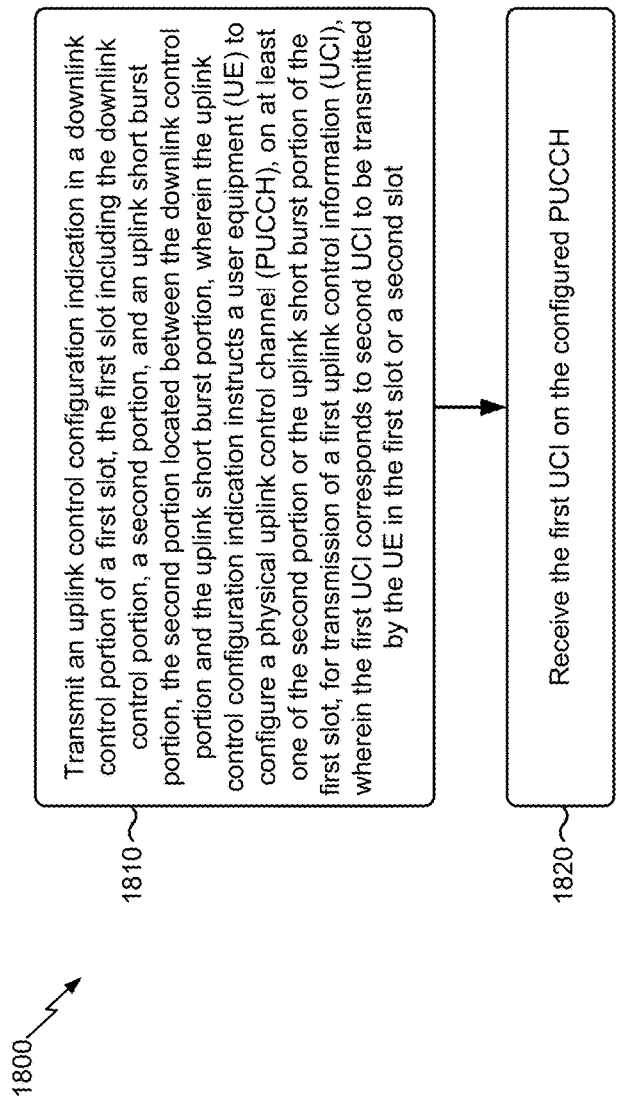
FIG. 18 is a flow chart of another method of wireless communication.

FIG. 18 is a flow chart 1800 of a method of wireless communication. The method may be performed by a base station (e.g., the base station 110 of FIG. 1, the apparatus 2102/2102' of FIGS. 21-22, and/or the like).

At 1810, the base station may transmit an uplink control configuration indication in a downlink control portion of a first slot, the first slot including the downlink control portion, a second portion, and an uplink short burst portion, the second portion located between the downlink control portion and the uplink short burst portion, wherein the uplink control configuration indication instructs a user equipment (UE) to configure a physical uplink control channel (PUCCH), on at least one of the second portion or the uplink short burst portion of the first slot, for transmission of a first uplink control information (UCI), wherein the first UCI corresponds to second UCI to be transmitted by the UE in the first slot or a second slot. In some aspects, the base station may transmit an uplink control configuration indication in a downlink control portion of a first slot. In some aspects, the first slot includes the downlink control portion, a second portion, and an uplink short burst portion. In some aspects, the second portion is located between the downlink control portion and the uplink short burst portion. In some aspects, the uplink control configuration indication instructs a UE to configure a PUCCH, on at least one of the second portion or the uplink short burst portion of the first slot, for transmission of a first UCI. In some aspects, the first UCI corresponds to second UCI to be transmitted by the UE in the first slot or a second slot. Additional details are described above in connection with FIGS. 7-16B.

At 1820, the base station may receive the first UCI on the configured PUCCH. In some aspects, the UE may transmit the first UCI on the configured PUCCH, and the base station may receive the first UCI on the configured PUCCH. Additional details are described above in connection with FIGS. 7-16B.

Although FIG. 18 shows example blocks of a method of wireless communication, in some aspects, the method may include additional blocks, fewer blocks, different blocks, or differently arranged blocks than those shown in FIG. 18. Additionally, or alternatively, two or more blocks shown in FIG. 18 may be performed in parallel.

Figure 19:
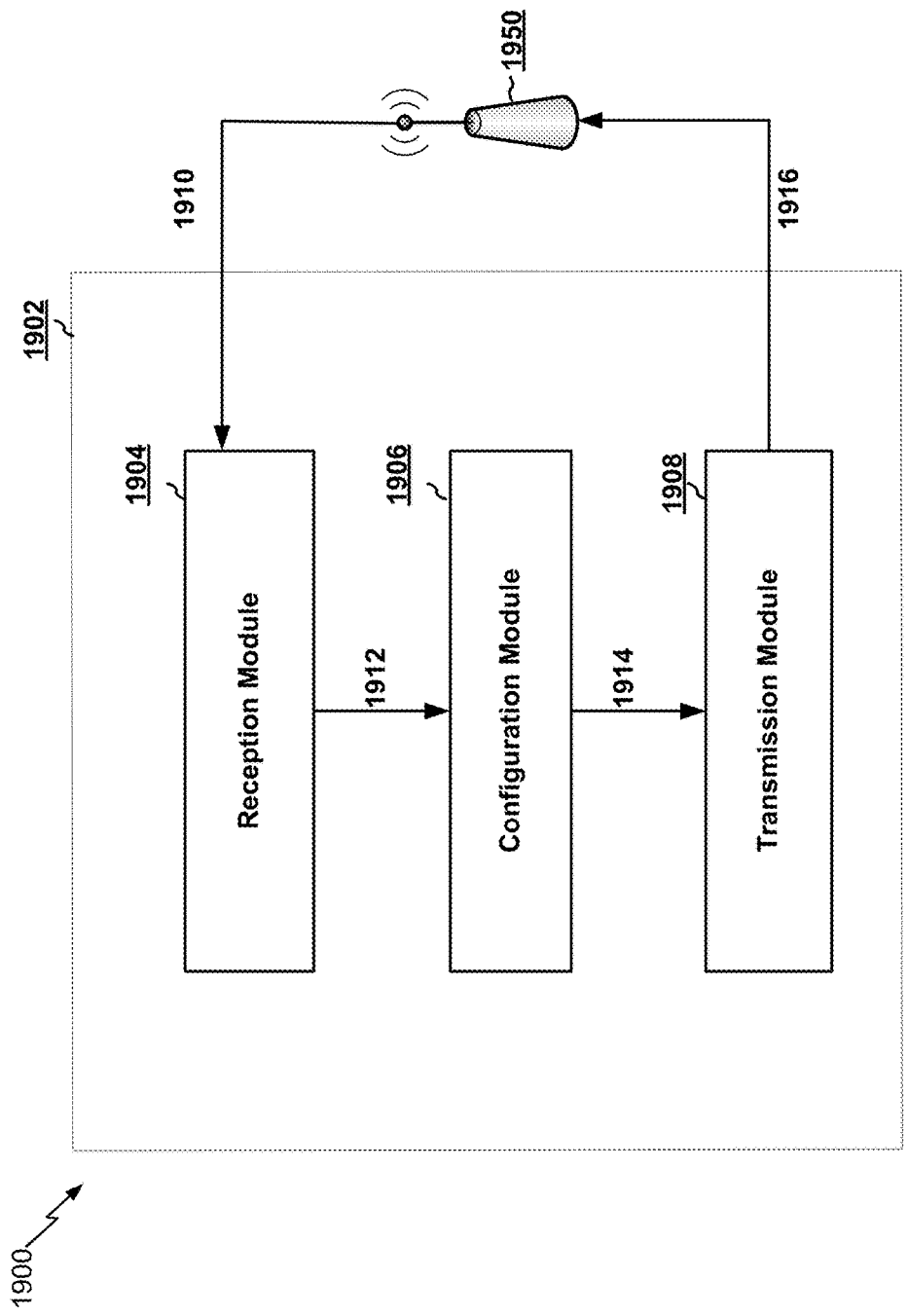
FIG. 19 is a conceptual data flow diagram illustrating the data flow between different modules/means/components in an example apparatus.

FIG. 19 is a conceptual data flow diagram 1900 illustrating the data flow between different modules/means/components in an example apparatus 1902. The apparatus 1902 may be a UE (e.g., the UE 120 of FIG. 1 and/or the like). In some aspects, the apparatus 1902 includes a reception module 1904, a configuration module 1906, and/or a transmission module 1908.

The reception module 1904 may receive, from a base station 1950 and as data 1910, one or more uplink control configuration indications, as described in more detail elsewhere herein. The reception module 1904 may provide the one or more uplink control configuration indications to the configuration module 1906 as data 1912. The configuration module may configure a PUCCH based at least in part on the one or more uplink control configuration indications, as described in more detail elsewhere herein. The configuration module 1906 may provide data 1914 associated with the configuration to transmission module 1908. The transmission module 1908 may transmit UCI, based at least in part on the data 1914 (e.g., using one or more slots, frequency bands, etc. configured by the configuration module 1906), to the base station 1950 as data 1916.

The apparatus may include additional modules that perform each of the blocks of the algorithm in the aforementioned flow chart of FIG. 17. As such, each block in the aforementioned flow chart of FIG. 17 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 19 are provided as an example. In practice, there may be additional modules, fewer modules, different modules, or differently arranged modules than those shown in FIG. 19. Furthermore, two or more modules shown in FIG. 19 may be implemented within a single module, or a single module shown in FIG. 19 may be implemented as multiple, distributed modules. Additionally, or alternatively, a set of modules (e.g., one or more modules) shown in FIG. 19 may perform one or more functions described as being performed by another set of modules shown in FIG. 19.

Figure 20:
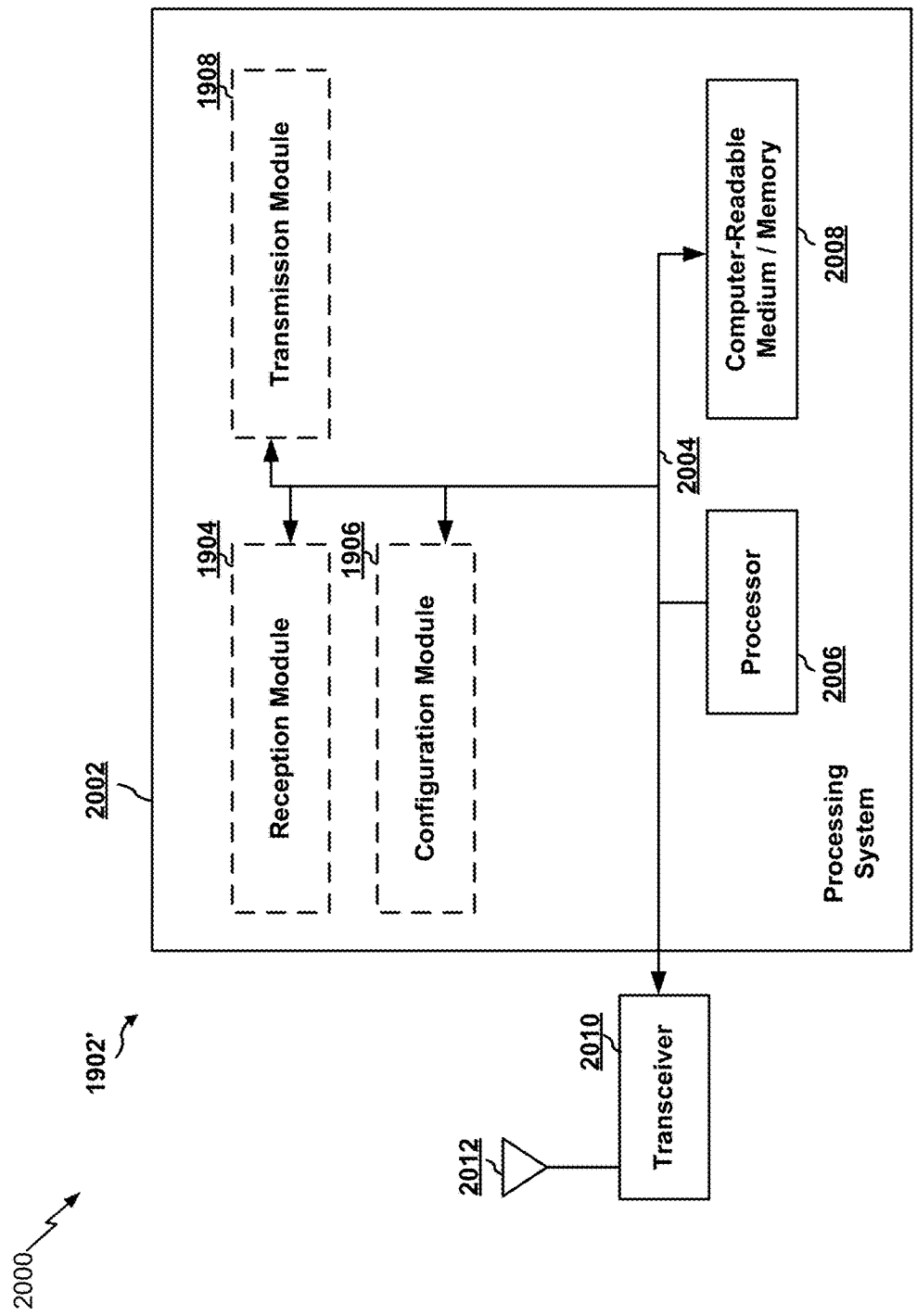
FIG. 20 is a diagram illustrating an example of a hardware implementation for an apparatus employing a processing system.

FIG. 20 is a diagram 2000 illustrating an example of a hardware implementation for an apparatus 1902' employing a processing system 2002. The apparatus 1902' may be a UE (e.g., the UE 120 of FIG. 1 and/or the like).

The processing system 2002 may be implemented with a bus architecture, represented generally by the bus 2004. The bus 2004 may include any number of interconnecting buses and bridges depending on the specific application of the processing system 2002 and the overall design constraints. The bus 2004 links together various circuits including one or more processors and/or hardware modules, represented by the processor 2006, the modules 1904, 1906, and/or 1908, and the computer-readable medium/memory 2008. The bus 2004 may also link various other circuits such as timing sources, peripherals, voltage regulators, and power management circuits, which are well known in the art, and therefore, will not be described any further.

The processing system 2002 may be coupled to a transceiver 2010. The transceiver 2010 is coupled to one or more antennas 2012. The transceiver 2010 provides a means for communicating with various other apparatus over a transmission medium. The transceiver 2010 receives a signal from the one or more antennas 2012, extracts information from the received signal, and provides the extracted information to the processing system 2002, specifically the reception module 1904. In addition, the transceiver 2010 receives information from the processing system 2002, specifically the transmission module 1908, and based at least in part on the received information, generates a signal to be applied to the one or more antennas 2012. The processing system 2002 includes a processor 2006 coupled to a computer-readable medium/memory 2008. The processor 2006 is responsible for general processing, including the execution of software stored on the computer-readable medium/memory 2008. The software, when executed by the processor 2006, causes the processing system 2002 to perform the various functions described supra for any particular apparatus. The computer-readable medium/memory 2008 may also be used for storing data that is manipulated by the processor 2006 when executing software. The processing system further includes at least one of the modules 1904, 1906, and/or 1908. The modules may be software modules running in the processor 2006, resident/stored in the computer-readable medium/memory 2008, one or more hardware modules coupled to the processor 2006, or some combination thereof. The processing system 2002 may be a component of the UE 120 and may include the memory 282 and/or at least one of the TX MIMO processor 266, the RX processor 258, and/or the controller/processor 280.

In some aspects, the apparatus 1902/1902' for wireless communication includes means for receiving an uplink control configuration indication, means for configuring a PUCCH, and/or means for transmitting first UCI on the configured PUCCH. The aforementioned means may be one or more of the aforementioned modules of the apparatus 1902 and/or the processing system 2002 of the apparatus 1902' configured to perform the functions recited by the aforementioned means. As described supra, the processing system 2002 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 20 is provided as an example. Other examples are possible and may differ from what was described in connection with FIG. 20.

Figure 21:
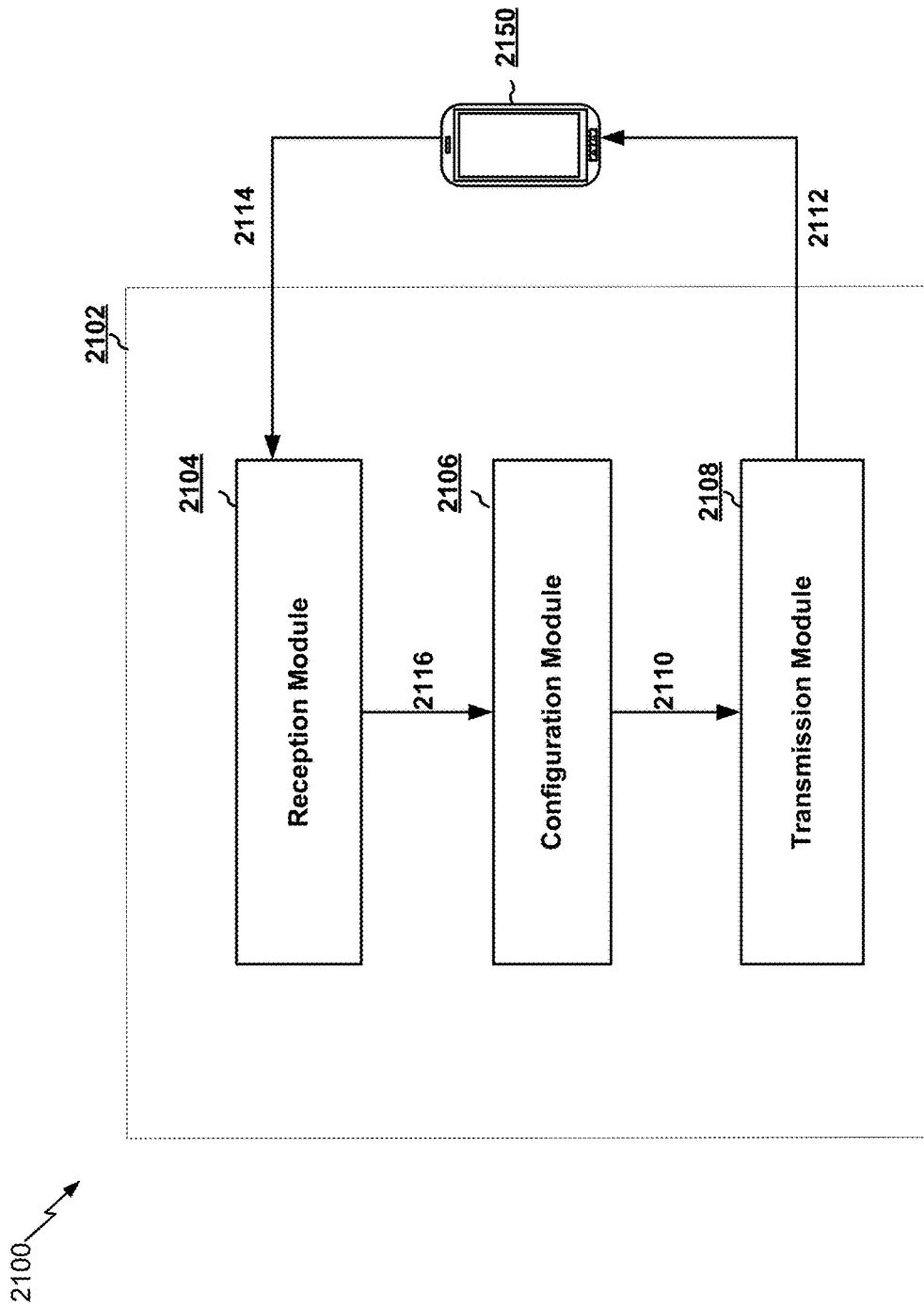
FIG. 21 is a conceptual data flow diagram illustrating the data flow between different modules/means/components in another example apparatus.

FIG. 21 is a conceptual data flow diagram 2100 illustrating the data flow between different modules/means/components in an example apparatus 2102. The apparatus 2102 may be a base station (e.g., the base station 110 of FIG. 1 and/or the like). In some aspects, the apparatus 2102 includes a reception module 2104, a configuration module 2106, and/or a transmission module 2108.

In some aspects, the configuration module 2106 may configure an uplink control configuration indication for a UE 2150, and may provide the uplink control configuration indication to the transmission module 2108 as data 2110. The transmission module 2108 may transmit the uplink control configuration indication to the UE 2150 as data 2112. The reception module 2014 may receive UCI from the UE 2150 as data 2114. The UCI may be received on a PUCCH configured according to the uplink control configuration indication. The reception module 2104 may decode the UCI and/or may decode other information received from the UE 2150, and may provide data 2116 to the configuration module 2106. The configuration module 2106 may reconfigure additional uplink control configuration indications for the UE 2150 as appropriate.

The apparatus may include additional modules that perform each of the blocks of the algorithm in the aforementioned flow chart of FIG. 18. As such, each block in the aforementioned flow chart of FIG. 18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 21 are provided as an example. In practice, there may be additional modules, fewer modules, different modules, or differently arranged modules than those shown in FIG. 21. Furthermore, two or more modules shown in FIG. 21 may be implemented within a single module, or a single module shown in FIG. 21 may be implemented as multiple, distributed modules. Additionally, or alternatively, a set of modules (e.g., one or more modules) shown in FIG. 21 may perform one or more functions described as being performed by another set of modules shown in FIG. 21.

Figure 22:
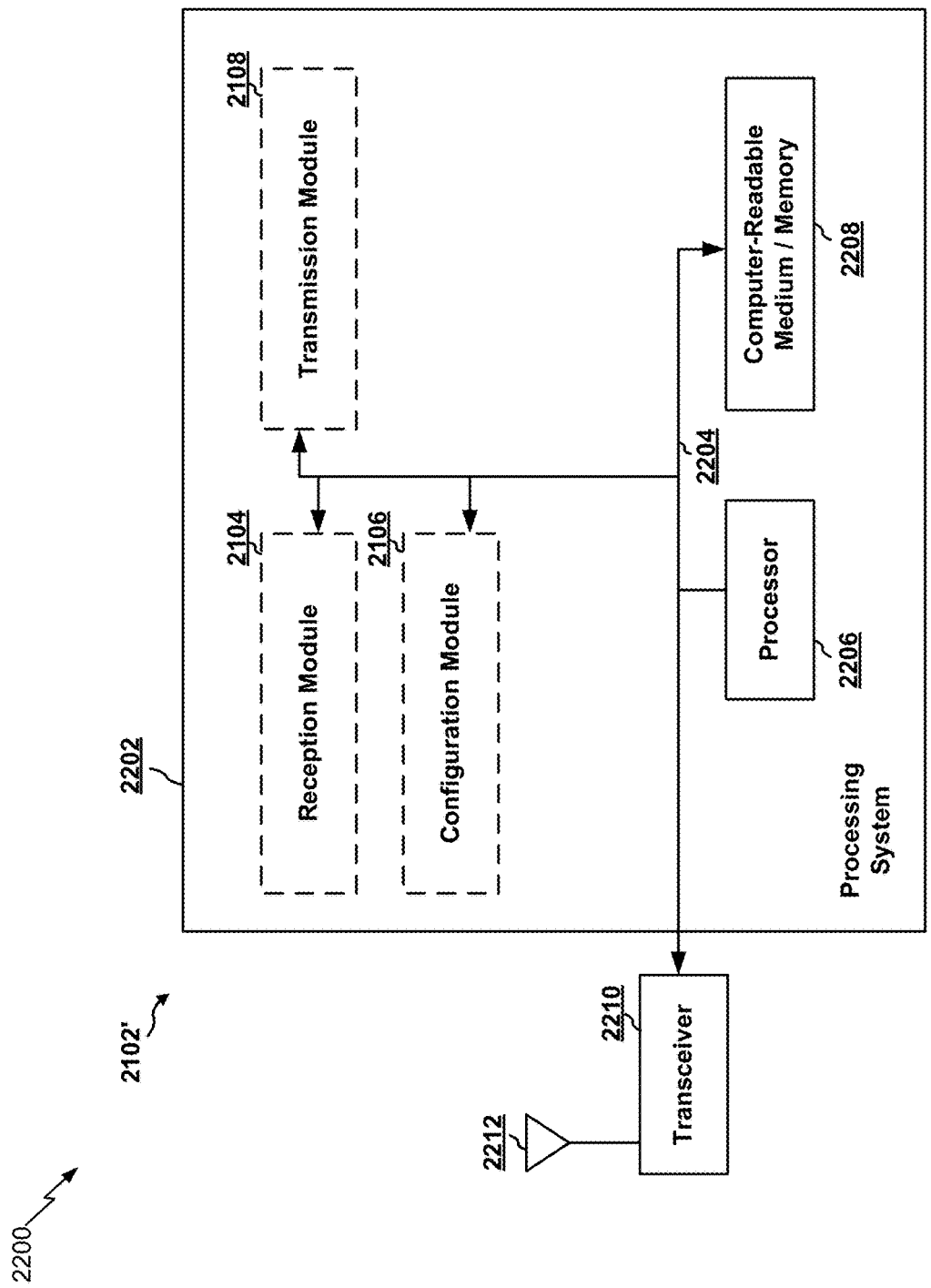
FIG. 22 is a diagram illustrating another example of a hardware implementation for an apparatus employing a processing system.

FIG. 22 is a diagram 2200 illustrating an example of a hardware implementation for an apparatus 2102' employing a processing system 2202. The apparatus 2102' may be a base station (e.g., the base station 110 of FIG. 1 and/or the like).

The processing system 2202 may be implemented with a bus architecture, represented generally by the bus 2204. The bus 2204 may include any number of interconnecting buses and bridges depending on the specific application of the processing system 2202 and the overall design constraints. The bus 2204 links together various circuits including one or more processors and/or hardware modules, represented by the processor 2206, the modules 2104, 2106, and/or 2108, and the computer-readable medium/memory 2208. The bus 2204 may also link various other circuits such as timing sources, peripherals, voltage regulators, and power management circuits, which are well known in the art, and therefore, will not be described any further.

The processing system 2202 may be coupled to a transceiver 2210. The transceiver 2210 is coupled to one or more antennas 2212. The transceiver 2210 provides a means for communicating with various other apparatus over a transmission medium. The transceiver 2210 receives a signal from the one or more antennas 2212, extracts information from the received signal, and provides the extracted information to the processing system 2202, specifically the reception module 2104. In addition, the transceiver 2210 receives information from the processing system 2202, specifically the transmission module 2108, and based at least in part on the received information, generates a signal to be applied to the one or more antennas 2212. The processing system 2202 includes a processor 2206 coupled to a computer-readable medium/memory 2208. The processor 2206 is responsible for general processing, including the execution of software stored on the computer-readable medium/memory 2208. The software, when executed by the processor 2206, causes the processing system 2202 to perform the various functions described supra for any particular apparatus. The computer-readable medium/memory 2208 may also be used for storing data that is manipulated by the processor 2206 when executing software. The processing system further includes at least one of the modules 2104, 2106, and/or 2108. The modules may be software modules running in the processor 2206, resident/stored in the computer-readable medium/memory 2208, one or more hardware modules coupled to the processor 2206, or some combination thereof. The processing system 2202 may be a component of the eNB 110 and may include the memory 242 and/or at least one of the TX MIMO processor 230, the RX processor 238, and/or the controller/processor 240.

In some aspects, the apparatus 2102/2102' for wireless communication includes means for transmitting an uplink control configuration indication and/or means for receiving first UCI on a configured PUCCH. The aforementioned means may be one or more of the aforementioned modules of the apparatus 2102 and/or the processing system 2202 of the apparatus 2102' configured to perform the functions recited by the aforementioned means. As described supra, the processing system 2202 may include the TX MIMO processor 230, the RX processor 238, and/or the controller/processor 240. As such, in one configuration, the aforementioned means may be the TX processor 230, the RX processor 238, and/or the controller/processor 240 configured to perform the functions recited by the aforementioned means.

FIG. 22 is provided as an example. Other examples are possible and may differ from what was described in connection with FIG. 22.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a user equipment (UE), an uplink control configuration indication in a downlink control portion of a first slot, the first slot including the downlink control portion, a second portion, and an uplink short burst portion, the second portion being located between the downlink control portion and the uplink short burst portion;

configuring, by the UE, a physical uplink control channel (PUCCH), on at least one of the second portion or the uplink short burst portion of the first slot, for transmission of first uplink control information (UCI) based at least in part on the uplink control configuration indication, wherein the first UCI corresponds to second UCI to be transmitted in the first slot or a second slot; and transmitting, by the UE, the first UCI on the configured PUCCH.

2. The method of claim 1, wherein the second portion is an uplink long burst portion and the first UCI and the second UCI are transmitted in the first slot.

3. The method of claim 2, wherein the PUCCH is configured on both the uplink long burst portion and the uplink short burst portion.

4. The method of claim 3, wherein the first UCI and the second UCI are jointly encoded as jointly encoded UCI.

5. The method of claim 4, wherein the uplink control configuration indication indicates whether the PUCCH is to be configured in only the uplink long burst portion or in both the uplink long burst portion and the uplink short burst portion.

6. The method of claim 5, wherein one or more bits of the jointly encoded UCI are truncated when the uplink control configuration indication indicates that the PUCCH is to be configured in only the uplink long burst portion.

7. The method of claim 5, wherein one or more bits of the jointly encoded UCI are repeated and transmitted in the uplink short burst portion when the uplink control configuration indication indicates that the PUCCH is to be configured in both the uplink long burst portion and the uplink short burst portion.

8. The method of claim 4, wherein one or more bits of the jointly encoded UCI are truncated or repeated based at least in part on a duration of the downlink control portion.

9. The method of claim 3, wherein the second UCI is a repeat of the first UCI;
wherein the first UCI is transmitted in the uplink long burst portion of the first slot; and
wherein the second UCI is transmitted in the uplink short burst portion of the first slot.

10. The method of claim 3, wherein the PUCCH is configured on one or more frequency bands signaled in the uplink control configuration indication or derived from a characteristic associated with reception of the uplink control configuration indication.

11. The method of claim 10, wherein the one or more frequency bands include one or more first frequency bands in the uplink long burst portion and one or more second frequency bands in the uplink short burst portion; wherein the one or more first frequency bands are:
the same as the one or more second frequency bands, or different from the one or more second frequency bands.

12. The method of claim 2, wherein a physical uplink shared channel (PUSCH) is configured on at least one of the uplink long burst portion or the uplink short burst portion for transmission of content concurrently with transmission of at least one of the first UCI or the second UCI.

13. The method of claim 1, wherein the second UCI is a repeat of the first UCI; and
wherein the PUCCH is configured on one or more first frequency bands of the first slot for transmission of the first UCI and one or more second frequency bands of the second slot for transmission of the second UCI, wherein the one or more first frequency bands are:
the same as the one or more second frequency bands, or different from the one or more second frequency bands.

14. The method of claim 13, wherein the one or more first frequency bands are determined based at least in part on the uplink control configuration indication received in the downlink control portion of the first slot; and
wherein the one or more second frequency bands are determined based at least in part on a different uplink control configuration indication received in a downlink control portion of the second slot.

15. The method of claim 14, wherein the second UCI is not transmitted based at least in part on receiving an indication that the first UCI was successfully decoded by a base station.

16. The method of claim 13, wherein the downlink control portion of the first slot is a first downlink control portion, the second portion of the first slot is a first uplink long burst portion, and the uplink short burst portion of the first slot is a first uplink short burst portion; and
wherein the second slot includes a second downlink control portion, a second uplink long burst portion, and a second uplink short burst portion.

17. The method of claim 16, wherein the first UCI is transmitted in at least one of the first uplink long burst portion or the first uplink short burst portion of the first slot; and
wherein the second UCI is transmitted in at least one of the second uplink long burst portion or the second uplink short burst portion of the second slot.

18. The method of claim 1, wherein the first UCI and the second UCI are jointly encoded as jointly encoded UCI; and
wherein the PUCCH is configured on one or more first frequency bands of the first slot and one or more second frequency bands of the second slot for transmission of the jointly encoded UCI, wherein the one or more first frequency bands are:
the same as the one or more second frequency bands, or different from the one or more second frequency bands.

19. The method of claim 18, wherein the one or more first frequency bands and the one or more second frequency bands are determined based at least in part on the uplink control configuration indication received in the downlink control portion of the first slot.

20. The method of claim 18, wherein the one or more first frequency bands and the one or more second frequency bands are determined based at least in part on a frequency offset derived from a characteristic associated with reception of the uplink control configuration indication.

21. The method of claim 18, wherein the second portion of the first slot is a first uplink long burst portion and the uplink short burst portion of the first slot is a first uplink short burst portion; and
wherein the second slot includes a second uplink long burst portion and a second uplink short burst portion.

22. The method of claim 21, wherein the second slot does not include a downlink control portion.

23. The method of claim 21, wherein the jointly encoded UCI is transmitted in at least one of the first uplink long burst portion or the first uplink short burst portion of the first slot and at least one of the second uplink long burst portion or the second uplink short burst portion of the second slot.

24. The method of claim 1, wherein the first slot and the second slot are contiguous.

25. The method of claim 1, wherein the first slot and the second slot are non-contiguous.

26. The method of claim 1, wherein the uplink control configuration indication indicates at least one of:
- a number of slots in which UCI is to be repeated or jointly encoded,
- whether the first UCI and the second UCI are to be repeated or jointly encoded in contiguous slots or non-contiguous slots,
- a slot pattern for transmission of repeated UCI or jointly encoded UCI,
- whether the second slot is to be configured to include a downlink control portion, or
- some combination thereof.

27. The method of claim 1, wherein the first UCI and the second UCI are configured to be:
- repeated UCI when a payload of UCI, including the first UCI and the second UCI, has a size that is less than or equal to a first threshold,
- repeated UCI when a number of slots to be used to transmit the payload of UCI is greater than or equal to a second threshold,
- jointly encoded UCI when the size is greater than or equal to the first threshold, or
- jointly encoded UCI when the number of slots is less than or equal to the second threshold.

28. A method of wireless communication, comprising:
transmitting, by a base station, an uplink control configuration indication in a downlink control portion of a first slot, the first slot including the downlink control portion, a second portion, and an uplink short burst portion, the second portion located between the downlink control portion and the uplink short burst portion,
wherein the uplink control configuration indication instructs a user equipment (UE) to configure a physical uplink control channel (PUCCH), on at least one of the second portion or the uplink short burst portion of the first slot, for transmission of a first uplink control information (UCI), wherein the first UCI corresponds to second UCI to be transmitted by the UE in at least one of the first slot or a second slot; and
receiving, by the base station, the first UCI on the configured PUCCH.

29. A user equipment (UE) for wireless communication, comprising:
a memory; and
one or more processors operatively coupled to the memory, the memory and the one or more processors being configured to:
receive an uplink control configuration indication in a downlink control portion of a first slot, the first slot including the downlink control portion, a second portion, and an uplink short burst portion, the second portion being located between the downlink control portion and the uplink short burst portion;
configure a physical uplink control channel (PUCCH), on at least one of the second portion or the uplink short burst portion of the first slot, for transmission of first uplink control information (UCI) based at least in part on the uplink control configuration indication, wherein the first UCI corresponds to second UCI to be transmitted in the first slot or a second slot; and
transmit the first UCI on the configured PUCCH.

30. A base station for wireless communication, comprising:
a memory; and
one or more processors operatively coupled to the memory, the memory and the one or more processors being configured to:
transmit an uplink control configuration indication in a downlink control portion of a first slot, the first slot including the downlink control portion, a second portion, and an uplink short burst portion, the second portion located between the downlink control portion and the uplink short burst portion,
wherein the uplink control configuration indication instructs a user equipment (UE) to configure a physical uplink control channel (PUCCH), on at least one of the second portion or the uplink short burst portion of the first slot, for transmission of a first uplink control information (UCI), wherein the first UCI corresponds to second UCI to be transmitted by the LIE in at least one of the first slot or a second slot; and
receive the first UCI on the configured PUCCH.

* * * * *